United States Patent
Günther et al.

(10) Patent No.: US 12,411,022 B2
(45) Date of Patent: Sep. 9, 2025

(54) PROCESS AND SYSTEM FOR DETERMINING A FLOOR PLAN

(71) Applicant: Dräger Safety AG & Co. KGaA, Lübeck (DE)

(72) Inventors: Martin Günther, Lübeck (DE); Nikolas Müller, Lübeck (DE)

(73) Assignee: DRÄGER SAFETY AG & CO. KGAA, Lübeck (DE)

(*) Notice: Subject to any disclaimer, the term of this patent is extended or adjusted under 35 U.S.C. 154(b) by 349 days.

(21) Appl. No.: 18/076,564

(22) Filed: Dec. 7, 2022

(65) Prior Publication Data

US 2023/0175861 A1 Jun. 8, 2023

(30) Foreign Application Priority Data

Dec. 8, 2021 (DE) .......................... 102021132241.3

(51) Int. Cl.
*G01C 21/30* (2006.01)
*G01C 21/00* (2006.01)
(Continued)

(52) U.S. Cl.
CPC ............ *G01C 21/3848* (2020.08); *G06T 7/12* (2017.01); *G06T 7/246* (2017.01); *G06T 7/73* (2017.01);
(Continued)

(58) Field of Classification Search
CPC .................. G01C 21/3848; G01C 21/206; G01C 21/383; G06T 7/12; G06T 7/246;
(Continued)

(56) References Cited

U.S. PATENT DOCUMENTS

| | | | |
|---|---|---|---|
| 6,753,914 B1* | 6/2004 | Frost | H04N 1/4076 348/246 |
| 2008/0179523 A1* | 7/2008 | Barker | B82Y 20/00 250/338.1 |

(Continued)

FOREIGN PATENT DOCUMENTS

| | | | |
|---|---|---|---|
| CA | 3058602 A1 | | 4/2020 |
| EP | 2 720 172 | * | 4/2014 |

OTHER PUBLICATIONS

Zhang et al., "Walk&Sketch: Create Floor Plans with an RGB-D Camera", Proceedings of the 2012 ACM Conference on Ubiquitous Computing (Year: 2012).*

(Continued)

*Primary Examiner* — Qian Yang
(74) *Attorney, Agent, or Firm* — McGlew and Tuttle, P.C.

(57) ABSTRACT

A process and a system automatically determine a floor plan of a spatial area (Et). A mobile sensor arrangement includes a camera and a motion sensor and is moved through the spatial area (Et). The camera generates an image sequence. The motion sensor generates a motion signal. Using the motion signal, a camera trajectory (Tr) is determined that describes the actual motion path of the camera through the spatial area (Et). Those image segments in the images are determined that each show at least one person. Key points are detected in the remaining image segments. Contiguous horizontal surface segments (Zus.1, Zus.2, ...) are determined in the images. Using the horizontal surface segments (Zus.1, Zus.2, ...), contiguous floor segments (R.1, R.2) are determined. The floor plan is determined using the camera trajectory and the contiguous floor segments.

19 Claims, 15 Drawing Sheets

(51) Int. Cl.
  *G06T 7/12* (2017.01)
  *G06T 7/246* (2017.01)
  *G06T 7/73* (2017.01)
  *G06V 10/764* (2022.01)
  *G06V 10/774* (2022.01)
  *G06V 40/10* (2022.01)

(52) U.S. Cl.
  CPC .......... *G06V 10/764* (2022.01); *G06V 10/774* (2022.01); *G06V 40/10* (2022.01); *G06T 2207/10016* (2013.01); *G06T 2207/30241* (2013.01)

(58) Field of Classification Search
  CPC ............. G06T 7/73; G06T 2207/10016; G06T 2207/30241; G06T 2207/10048; G06T 2207/30244; G06T 7/579; G06T 17/05; G06V 10/764; G06V 10/774; G06V 40/10; G06V 20/10
  See application file for complete search history.

(56) References Cited

U.S. PATENT DOCUMENTS

| | | | | |
|---|---|---|---|---|
| 2014/0320121 | A1* | 10/2014 | Perttunen | G01C 21/08 |
| | | | | 324/244 |
| 2016/0225121 | A1* | 8/2016 | Gupta | G06T 3/00 |
| 2020/0292694 | A1* | 9/2020 | Fleming | H01Q 21/205 |
| 2021/0125397 | A1 | 4/2021 | Moulon et al. | |
| 2021/0225081 | A1 | 7/2021 | Tang et al. | |

OTHER PUBLICATIONS

G. Grisetti, R. Kümmerle, C. Stachniss & W. Burgard: "A Tutorial on Graph-Based SLAM," IEEE Intell. Transp. Syst. Mag. 2(4), pp. 31-43, 2010.

T. Qin, P. Li & S. Shen: "Vins-mono: A Robust and Versatile Monocular Visual-Inertial State Estimator", IEEE Transactions on Robotics, 34(4), 2018, pp. 1004-1020.

J. Shi & C. Tomasi, "Good Features to Track," IEEE 19/94, pp. 1063-1069.

E. Mair, G.-D. Hager, D. Burschka, M. Suppa & G. Hirzinger: "Adaptive and Generic Corner Detection based on the Accelerated Segment Test", European Conf. on Computer Vision, Sep. 2010, pp. 183-196, Springer.

F. Meyer: "Color Image Segmentation", Proceed. International Conference on Image Processing and its Applications, pp. 303-306, IET, 1992.

Agarwal, Sameer and Mierle, Keir and the Ceres Solver Team. Ceres Solver. Apache-2.0, 2.1, Mar. 2022.

L. Luft, T. Schubert, S. I. Roumeliotis & W. Burgard: "Recursive Decentralized Collaborative Localization for Sparsely Communicating Robots," Robotics: Science and Systems, Jun. 2016.

Kemper J. & Holger L.: "Challenges of Passive Infrared Indoor Localization," Proceedings of the 5th Workshop on Positioning, Navigation and Communication. 2008.

* cited by examiner

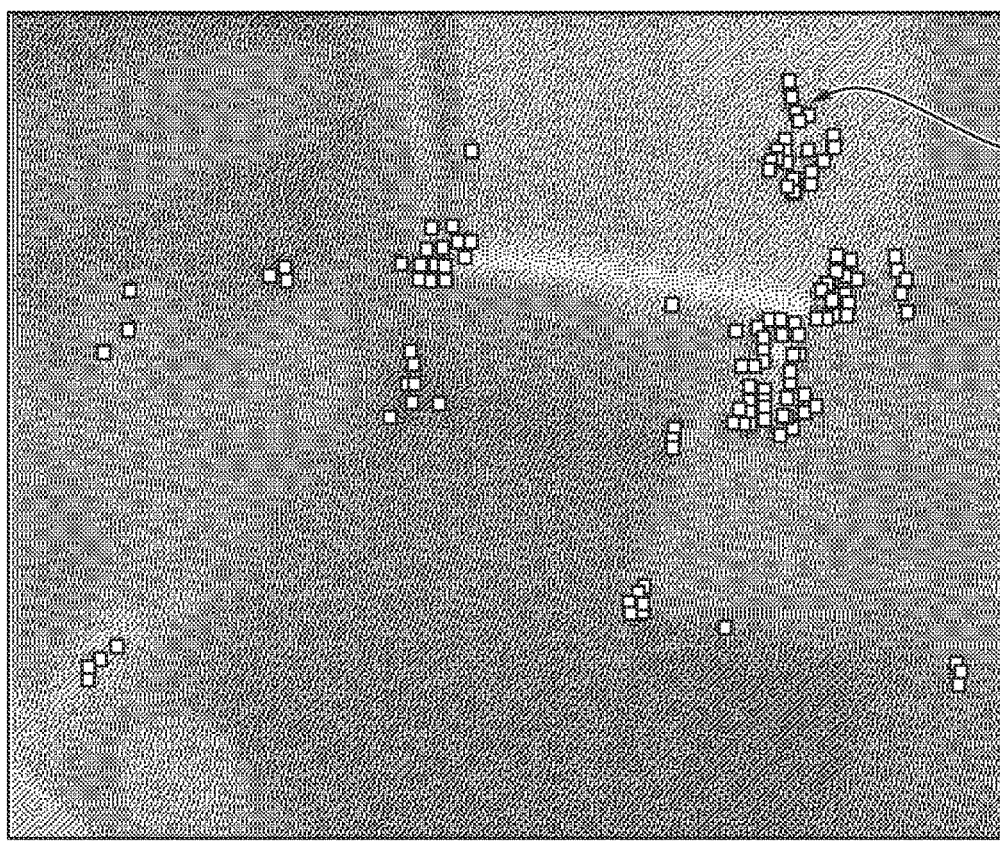
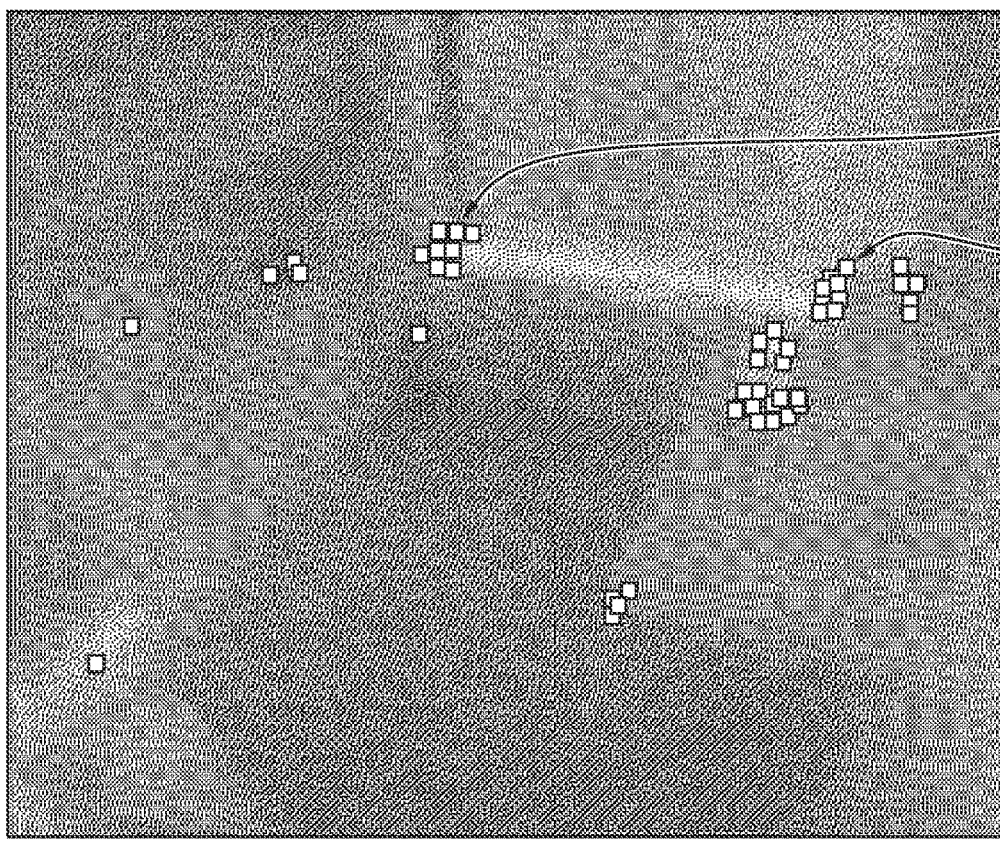
FIG. 5

PROCESS AND SYSTEM FOR DETERMINING A FLOOR PLAN

CROSS REFERENCE TO RELATED APPLICATIONS

This application claims the benefit of priority under 35 U.S.C. § 119 of German Application 10 2021 132 241.3, filed Dec. 8, 2021, the entire contents of which are incorporated herein by reference

TECHNICAL FIELD

The invention relates to a process and a system which are able to automatically determine a floor plan of a spatial area. The spatial area is in particular a floor of a building.

BACKGROUND

The task of determining such a floor plan occurs, for example, when a fire has broken out in a building and therefore a floor or the entire building is smoky and firefighters or other rescue workers do not know the building. Nevertheless, the rescue workers should be able to orient themselves on the floor. In particular, the rescue workers should be able to rescue people from the building. This requires finding any room where a person to be rescued may or could be. In many cases, in such a situation a floor plan of the floor is not available. In addition, an existing floor plan may be out of date.

SUMMARY

It is an object of the invention to provide a process and a system which are capable of automatically determining a floor plan of a spatial area with relatively little effort.

The task is solved by a process having features according to the invention and by a system having features according to the invention. Advantageous embodiments of the process according to the invention are, as far as useful, also advantageous embodiments of the system according to the invention and vice versa.

The process and system according to the invention are capable of automatically determining a floor plan of a spatial area. The spatial area is in particular a floor of a building or, for example, an area of a production plant or a storage area. The process and the system can also be applied to determine the floor plan of a land vehicle, watercraft, or aircraft.

A "building" is understood to be a structure in which people can stay at least temporarily and/or in which objects are kept ready. Residential buildings, factory buildings, warehouses, transport infrastructure buildings (train stations, airports) and garages are examples of buildings.

The term "floor of a building" (story of a building) means an area in a building, where this area or at least a part of this area can be entered or at least viewed by a human being and where the area can be above ground level, at ground level or below ground level (basement).

A "floor plan of a spatial area" is understood to be a presentation that can be visually perceived by a human being and that shows at least approximately and schematically in a plan view the rooms, walls, windows and/or passages as well as stairs in this spatial area. The determined floor plan can be in a computer-available and/or paper-based form. Optionally, the floor plan shows the respective ceiling height. It is possible to output this floor plan in a form that can be visually perceived by a human.

A "trajectory" in a three-dimensional coordinate system is a sequence of points in this coordinate system, where this sequence of points describes a motion path through the coordinate system. The motion path, which is described by the trajectories, describes in particular the motion path of an object, here a camera, through the spatial area. As a rule, a determined trajectory is only an approximation for the actual motion path of the object.

A "key point" in the spatial area and thus in the three-dimensional coordinate system is understood to be a point—more generally: a segment—with characteristic properties that can be recognized visually and thus in images, in particular a corner point, i.e. a point where at least two, preferably three walls of the building meet. In the context of the invention, such a key point ideally does not move relative to the spatial area.

The process according to the invention is carried out using a mobile sensor arrangement. The system according to the invention comprises a mobile sensor arrangement and a data processing signal processing unit. Preferably, the process is also carried out using such a signal processing unit. The mobile sensor arrangement comprises a camera and a motion sensor.

The mobile sensor arrangement can be moved through the spatial area. The camera is able to generate an image sequence. The motion sensor can generate a motion signal. The motion signal describes in a given three-dimensional coordinate system the movements of the motion sensor and thus the movements of an object connected to the motion sensor as this object is moved through the spatial area. The signal processing unit is able to receive and process an image signal from the camera describing the image sequence and a motion signal from the motion sensor.

The process includes the following steps performed automatically, and the system is configured to perform the following steps automatically:

The mobile sensor arrangement is moved through the spatial area. It is possible that a person moves the mobile sensor arrangement through the spatial area. It is also possible that the mobile sensor arrangement is moved through the area by an autonomous vehicle.

While the camera is moved through the spatial area as part of the mobile sensor arrangement, the camera generates an image sequence. All or at least some images of this sequence are automatically investigated. The automatically investigated images of the sequence are hereinafter also referred to as images of an "image sequence".

The motion sensor generates a motion signal. This motion signal is a measure for the actual movements that the camera makes as it is moved through the spatial area. As a rule, the motion signal only approximately describes the actual movements of the camera.

A camera trajectory is determined. This camera trajectory describes at least approximately the actual motion path of the camera as the camera is moved through the spatial area. The camera trajectory refers to a given three-dimensional coordinate system. To determine the camera trajectory, the motion signal is used.

In the images of the image sequence, those image segments are determined that each show at least one person. Of course, it is possible that no image segment showing a person is determined in an image. It is also possible that at least two image segments are determined in an image, each of which shows a person. These two image segments can be spatially separated from each other or overlap. The two image segments can show the same person or two different persons.

Key points are detected. A detected key point is shown in at least two consecutive images of the image sequence. When searching for key points, those image segments of the images which each show at least one person are excluded from the search. In other words: Key points are only searched for in those image segments of the images of the image sequence that do not show a person. For determining the camera trajectory detected key points are used.

In images of the image sequence, preferably in all images, contiguous horizontal surface segments are determined. For the determination of contiguous horizontal surface segments, again those image segments are excluded which each show at least one person. In other words: The system searches for contiguous horizontal surface segments only in those image segments of the images in the image sequence that do not show a person. To determine the contiguous horizontal surface segments, the detected key points are used. Preferably, the or at least some of the contiguous horizontal surface segments are rectangular or trapezoidal.

In images of the image sequence, contiguous floor segments are determined. The determined horizontal surface segments are used for this determination. Preferably, contiguous horizontal floor segments are determined. It is possible that several horizontal surface segments belong to the same contiguous floor segment of the spatial area.

The floor plan of the spatial area is determined. To determine the floor plan, the determined camera trajectory is used on the one hand. On the other hand, the determined contiguous floor segments are used.

These steps are performed automatically, for example using a data processing signal processing unit having at least one processor and at least one data storage. An exception may be the step of moving the mobile sensor arrangement through the spatial area. This movement may be performed by a human, in particular by a rescue worker wearing the mobile sensor arrangement on his/her protective equipment.

The invention enables, but does not require, a floor plan of the spatial area to be provided. Rather, the invention automatically determines such a floor plan. Thus, the invention can be used when firefighters or other rescue workers should be able to enter the spatial area and orient themselves in the spatial area, although the spatial area is unknown to them, and they also do not have a floor plan or other map of the spatial area. The floor plan determined according to the invention is up to date, whereas a floor plan generated earlier may be outdated or not available.

According to the invention, key points are used to determine the camera trajectory. Preferably, the key points are also used to determine the contiguous horizontal surface segments. These key points can in many cases be recognized in different images, even if these different images were generated with different viewing directions, viewing angles and/or from different heights. Such key points occur especially in edges between each horizontal surface segment and a wall of the spatial area. Such edges occur in particular in buildings. According to the invention, the fact is exploited that ideally the position of a key point remains unchanged while the mobile sensor arrangement is moved through the spatial area. If the same key point is shown at different positions in different images of the image sequence, this difference usually results from the movement of the mobile sensor arrangement relative to the spatial area, but not from a movement of the key point.

The determined trajectory could in particular deviate relatively strongly from the actual motion path of the camera if a detected key point moves relative to the spatial area. This can happen in particular if a key point would be detected in an image of a person and this person moves in the spatial area. To reduce the risk of this error, those image segments are detected in the images of the image sequence that each show at least one person. According to the invention, key points are not searched for in these image segments. In other words: Key points are searched for only in those segments of an image that do not show a person. In this way, image segments that show an image of a mirror image of a person are also excluded from the search for key points. Also, a mirror image of a person often moves relative to the spatial area when the person himself/herself moves.

The invention makes use of the fact that the floor plan is determined by a scan of a spatial area, this spatial area comprising a plurality of horizontal, i.e. planar, subareas. Between a plurality of horizontal subareas there may be a vertical offset which is bridged, for example, by a step or a staircase. This condition is often fulfilled, especially in buildings and other human-made objects. The contour of an area of the earth's surface or the seabed, on the other hand, often does not meet this condition. Therefore, a process suitable for scanning the earth's surface or the seabed is often not suitable for determining a floor plan.

In one embodiment, the motion sensor comprises an inertial sensor unit. Preferably, the inertial sensor unit generates a respective measure for each linear acceleration and each angular acceleration of the moved mobile sensor arrangement, wherein the mobile sensor arrangement performs these linear accelerations and these angular accelerations in the three-dimensional coordinate system as the mobile sensor arrangement is moved through the spatial area. The motion sensor is capable of generating the motion signal depending on the measures for the linear accelerations and the angular accelerations. Of course, it is possible that the mobile sensor arrangement is not moved at all or is only moved linearly or only rotated for individual periods of time, so that the linear acceleration and/or the angular acceleration is then equal to zero.

It is also possible that the motion sensor comprises a geoposition sensor that repeatedly measures its own geoposition, and the motion signal is generated depending on the time course of the measured geoposition. However, a geoposition sensor sometimes has the following disadvantage if the spatial area is the interior of a building: the outer walls of this building may shield a signal from a satellite wherein the geoposition sensor uses this signal. Especially in an enclosed building, a geoposition sensor is therefore often only able to measure its own geoposition incorrectly or even not at all. The two embodiments just mentioned, namely an inertial sensor unit and a geoposition sensor, can be combined.

Preferably, the motion sensor is connected to the camera in such a way that the distance between the motion sensor and the camera remains within a predetermined range of values. Particularly preferably, the motion sensor is not able to perform any relevant movement relative to the camera. Therefore, it is sufficient that the motion sensor measures its own motions, and the generated motion signal describes the motions of the motion sensor in the three-dimensional coordinate system. This motion signal is used as the motion signal of the moved camera. It is also possible to additionally measure the position and/or orientation of the camera relative to the motion sensor. The movements of the camera in three-dimensional coordinate systems are automatically derived from the motion signal and the measured position and/or orientation of the camera relative to the motion sensor.

According to the invention, the camera trajectory is determined which at least approximately describes the actual motion path of the camera as the camera is moved through the spatial area. In one embodiment, an initial trajectory is first determined, and then a corrected trajectory is generated using the initial trajectory, and then a final trajectory is generated using the corrected trajectory. This final trajectory is used as the camera trajectory as defined in the claims.

To determine the initial trajectory, the determined key points in consecutive images and the motion signal are used.

Among the determined key points, those key points are detected which are shown in at least two non-consecutive images of the image sequence. Such a key point is thus shown in two different images, whereby between these at least two images another image of the image sequence occurs in which this key point is not shown. This situation occurs in particular when the key point belongs to a first subarea of the spatial area but not to a second subarea, and the camera generates at least one image in the first subarea, afterwards at least one image in the second subarea, and afterwards again an image in the first subarea, wherein often the two or at least two images in the first subarea being generated from different viewing directions.

It is possible that the camera is moved several times through the same subarea of the spatial area, for example several times through the same room, and is located somewhere else in between while the camera is generating images. In the initial trajectory, multiple trajectory sections occur for these multiple movements of the camera through the same subarea. These trajectory sections often have too large distances from each other, i.e. larger distances from each other than the corresponding sections of the actual motion path. In particular, this error can be caused by the motion signal having a compounding (accumulating) error. Such an accumulating error is also referred to as "drift". According to the invention, the key points are used to detect that the camera has been in the same subarea several times in succession and in between at least once in another subarea. This detection is exploited to generate a three-dimensional corrected trajectory. The key points are automatically detected in different images.

From the initial trajectory, a corrected trajectory is generated, which also refers to the three-dimensional coordinate system. To generate the corrected trajectory, those key points are used which have been detected as just described, i.e. shown in at least two non-consecutive images of the image sequence. Each subarea of the spatial area in which the camera has generated at least twice at least one image each results in a corrected trajectory section in the corrected trajectory at least if there is an image between these at least two images that was not generated in this subarea. The distance between two different corrected trajectory sections, i.e. between two different sections of the corrected trajectory, is less than or equal to the distance between the two corresponding sections of the initial trajectory. It is possible that the section of the corrected trajectories coincides with the corresponding section of the initial trajectory.

A possible vertical drift in the corrected trajectory is eliminated by calculation. A "vertical drift" is understood to be an error in the motion signal that accumulates. Such a vertical drift can occur in particular if the motion signal is obtained from measured values of an inertial sensor unit. To eliminate the vertical drift, the assumption is used that the floor surface of the spatial area consists of several horizontal subareas. A vertical offset may occur between different horizontal subareas. A section of the corrected trajectory may have a vertical dimension. Automatically, a decision is made as to what causes this vertical dimension of the trajectory section. This decision is made between the following two alternatives:

The horizontal dimension is caused by an alternation between two different horizontal subareas, with a vertical offset occurring between these two horizontal subareas. The horizontal dimension is preferably maintained.

The trajectory section extends in the same horizontal section or in two horizontal subareas that extend in the same plane. The horizontal dimension is then an error in the corrected trajectory and is computationally eliminated. This eliminates or at least reduces vertical drift.

The just mentioned embodiment leads in many cases to a final trajectory which describes the actual motion path of the camera more accurately than the initial trajectory even if an inertial sensor unit is used as motion sensor. The use of an inertial sensor unit in many cases avoids the disadvantages and limitations often associated with a geoposition sensor, especially when the invention is used in a building and walls of the building may shield signals from a satellite.

According to the invention, those image segments are determined in the images of the sequence which each show at least one person. Furthermore, according to the invention, contiguous horizontal surface segments are determined. In a preferred embodiment, at least one of these two steps is performed by a pattern recognition process. A data processing classifier applies this pattern recognition process. The classifier automatically detects predetermined image segments in the images. In many cases, these image segments include in particular floors and walls, which are fully or at least partially visible in images. Image segments may also include ceiling surfaces, doors, furniture, and other furnishings. In one embodiment, the classifier recognizes those image segments in images of the image sequence that each show at least one person.

The classifier receives an image signal from the camera, which image signal describes the images of the image sequence. The classifier can be a part of the above-mentioned signal processing unit. The classifier may be a component of the mobile sensor arrangement or may be spatially separated from the mobile sensor arrangement.

The classifier is trained by automatically applying a learning procedure to a sample. The sample comprises a set of images, each showing a subarea of a spatial area, for example a subarea inside a building. The images may show subareas from different spatial areas and/or different subareas from the same spatial area. The images of the sample are generated by using a camera.

The camera that generates the images of the sample can be the camera of the mobile sensor arrangement, which is subsequently moved through the spatial area, or another camera. The images can show the same spatial area for which a floor plan is later determined, or at least one other spatial area.

The images of the sample are or will be annotated. This means: If an image of the sample shows a horizontal floor segment or a continuous floor surface, a wall, optionally a ceiling surface, a door, or a piece of furniture or also a person or a part of a person or also a mirror image of a person or a part of a person, this image segment is accordingly annotated, in a way that can be evaluated by a computer. Of course, an image of the sample may show at least two different elements, for example, both a floor surface, a door or a wall, and a person.

The step of training the classifier is performed before the classifier is applied as part of the process and system according to the invention. The classifier is capable of processing the sample and is thereby trained. If an image of the sample shows a person or a part of a person and/or a surface or floor segment, the image segment or each image segment showing the person or the part of the person or the surface or floor segment is annotated in this image.

In many cases the use of an annotated sample makes it possible to rapidly provide a classifier capable of recognizing with relatively high confidence a desired pattern in images of the image sequence, in particular an image of a person or an image of a part of a person or even of a segment of an area—or at least the outer contour of such an image. The classifier trained with the sample can be a standard program, and the step of training this standard classifier in many cases essentially comprises the step of providing the sample in a form that can be evaluated by a computer and having it evaluated by the classifier.

According to the invention, the camera generates an image sequence while the camera together with the mobile sensor arrangement is moved through the area. In one embodiment, the camera generates all images or at least a portion of the images of the image sequence in a wavelength range above 3 μm, particularly preferably above 7 μm, while moving through the area.

In many cases, a camera that operates according to this embodiment still delivers images that show contours of objects (living beings or objects) even when used in a smoky and/or smoke-filled area. As a rule, a wavelength of at least 3 μm is larger than the maximum diameter of a particle that may be in the air. In particular for this reason, the camera is able to produce evaluable images even if there are many particles in the air due to a fire and/or very strong dust formation. On the other hand, a camera that produces images in the visible range often does not provide usable images when used in a smoky and/or smoke-filled area. If the wavelength range is even above 7 μm, the risk of air humidity causing disturbing haze in the images is also reduced.

In images generated in a wavelength range above 3 μm, in many cases heat tone values can be determined. An image of a living being in a heat tone image usually has higher heat tone values than an image of an object. A heat source, on the other hand, often has significantly higher heat tone values than a living being. The heat tone values make it possible in many cases to decide with higher certainty whether a contour, appearing in an image of the image sequence, frames an image of a person or an image of a mirror image or an object, compared to an image produced in light in the visible range. Thus, the image of a person in an image can often be detected on the one hand by the contour and on the other hand by the heat tone values.

It is possible that the mobile sensor arrangement comprises a camera capable of generating images in the visible wavelength range in addition to or instead of the camera just described, which is capable of generating images in a wavelength range above 3 μm. Preferably, the classifier determines images, in particular contours, of people both in the images in the wavelength range above 3 μm and in the images in the visible wavelength range.

The configuration of using both a camera for images in the wavelength range above 3 μm and a camera for images in the visible wavelength range is useful in many cases, in particular for the following reason: Often, only a first subarea of the spatial area is smoky or smoked when a fire has broken out, while a second subarea is neither smoky nor smoked. In the first subarea, the camera is used for images in the wavelength range above 3 μm, while in the second subarea, the camera is used for images in the visible wavelength range.

The just described embodiment that the camera is capable of generating images in the wavelength range above 3 μm can be combined with the embodiment that a classifier is trained using a sample. In this combination, the sample used for training comprises images generated in a wavelength range above 3 μm and/or heat tone values from this wavelength range. This combination combines the advantages of such a camera with the advantages of a classifier. In many cases, an appropriately trained classifier is able to detect an image of a person on the basis of the contour on the one hand and on the basis of the heat tone values on the other hand and to distinguish it from images of other objects.

The combination just described, i.e. a camera for images in a wavelength range above 3 μm and a classifier that has been trained with an annotated sample, requires a sample with annotated heat tone images, i.e. images that have been generated in a wavelength range above 3 μm. In one embodiment, this sample is directly provided. In another embodiment, this sample is generated using an initial sample. This initial sample comprises annotated images generated with light in the visible range. Such annotated images are available in large numbers. From this initial sample, the sample used to train the classifier is generated. From some or even all images of the initial sample, one image of each sample used for training is generated. At least some images, preferably all images of the initial sample, are mapped, i.e. converted, to one image each in a wavelength range above 3 μm according to the preferred embodiment. Preferably, each pixel of each image of the initial sample corresponds exactly to one pixel of each image of the generated and used sample, and a hue value of the pixel in the visible range is mapped to a heat tone value of the image in the wavelength range above 3 μm. Thus, in this generation, each hue value (color value) of a pixel of an image of the initial sample is mapped to a heat tone value, that is, to a value in a wavelength range above 3 μm.

In particular, if the camera generates images in a wavelength range above 3 μm, strongly different values, in this case heat tone values, can occur in two immediately consecutive images of the image sequence. This abrupt change can be caused, for example, by changing the camera's viewing direction between these two images. In particular, the image of a heat source in an image is very different from an image of any other object or living being in an image if these images have been generated in a wavelength range above 3 μm. To avoid an abrupt change between the heat tone values and thus an abrupt change of the contrast in the image sequence, preferably at least one image of the image sequence is linearly normalized. Preferably, the entire image sequence is linearly normalized. For each image a respective normal value is calculated, which normal value is an average value of the pixels of this image. For example, an average heat tone value is calculated. In the linear normalization of an image, a respective pixel value is calculated for each pixel. The calculated pixel value lies in an interval of predetermined width around the normal value. The width of this interval is given. For example, the normal value forms the center of the interval. The images generated by such a linear normalization are used as image sequence. This configuration reduces strong leaps in the pixel values of consecutive images of the sequence.

The invention does not require that a map of the spatial area is available in advance. In one embodiment, however, the determination of the floor plan is further improved, for which purpose a reference map of the spatial area is provided and used in a computer-available form. This reference map shows at least one edge between a contiguous floor segment and a wall of the spatial area, preferably multiple edges.

According to this embodiment, the step of determining contiguous floor segments comprises the following automatically performed steps:
- Edges between at least one wall and a horizontal surface segment are determined, for which determination the contiguous horizontal surface segments determined according to the invention are used.
- The respective position and/or the respective orientation of at least one edge that has been determined in this way is corrected with the help of the reference map.

For example, a predetermined error function for the total deviation between the edges determined using the horizontal face segments and the edges in the reference map is minimized. Determined edges are computationally shifted or otherwise moved according to the minimized error function, preferably in a way that minimizes the error function.

According to the invention, a floor plan of a spatial area is determined. In one embodiment, a map is determined using this floor plan. This map comprises, for at least one floor segment of the determined floor plan, an identification of a level of this floor segment. Because the floor segment is generally horizontal, the level for each point on the floor segment is generally the same. The "level" of the floor segment is understood to be the vertical distance between the floor segment and a horizontal reference plane. This reference plane is predetermined or automatically determined. This reference plane is, for example, the plane of an entrance to a building or a floor of a building. Or the reference plane is determined such that the lowest point of the three-dimensional camera trajectory lies in this reference plane. To determine the level of a floor segment, the three-dimensional camera trajectory is evaluated.

According to the invention, a floor plan of a spatial area is determined. According to the invention, images generated by the camera of the mobile sensor arrangement are used to determine this floor plan. While the camera generates images, the camera is moved through the spatial area as part of the mobile sensor arrangement. In one embodiment, a person carries the mobile sensor arrangement with the camera while the person moves through the spatial area. For example, the person is a rescue person who moves through the spatial area, searching for persons in the spatial area to find and rescue or at least to recover those persons. In one embodiment, the mobile sensor arrangement is attached to a protective equipment of this person while the person is moving through the spatial area. For example, the camera is attached to a protective helmet.

The embodiment that a person moves the mobile sensor arrangement through the spatial area in many cases does not require any additional action by the person in the spatial area. Furthermore, in many cases, this embodiment eliminates the need for a human or even a robot to move the mobile sensor arrangement through the spatial area specifically for the purpose of having the camera generate images of the spatial area.

In another embodiment, an autonomous vehicle or a robot moves the mobile sensor arrangement through the spatial area. The embodiment with the vehicle or robot is particularly advantageous in a situation where a human cannot enter the spatial area even with personal protective equipment, for example due to a very high temperature, toxic gases, or a risk of collapse of a building.

In one embodiment, the determined floor plan or at least a section of the determined floor plan is displayed in a form that can be visually perceived by a human, namely on a display unit. In the displayed section, the current position of a portable device in the spatial area is additionally displayed. Preferably, this portable device comprises the display unit or is mechanically connected to the display unit. For example, the display unit belongs to a portable computer, in particular to a smartphone. Or the display unit is attached to protective equipment of a person moving through the spatial area. The configuration with the display unit makes it easier for a person to find his/her way around the spatial area and/or to locate a mobile device.

The display unit can be attached to the protective equipment of the person who is also carrying the mobile sensor arrangement through the spatial area, or to the protective equipment of another person in the spatial area. It is also possible that the display unit is located outside the spatial area and is viewed, for example, by a leader of the rescue task force.

It is possible that a viewer can use a suitable input unit to move the displayed section and/or to change the scale of the image. For example, the display unit comprises a touch-sensitive screen, as is known from a smartphone.

Preferably, the signal processing unit described above is able to control the display unit and to cause the display unit to show the section of the floor plan. In a further development of this embodiment, the signal processing unit is able to receive a signal from a position sensor, in particular an inertial sensor unit and/or a geoposition sensor. This signal is a measure for the current position of the display unit in the spatial area and thus of the current position of a user carrying the display unit.

According to this further development, it is automatically determined where in the spatial area the display unit and thus the user of the display unit are currently located. A signal from the position sensor is used for this determination. Preferably, the section of the determined floor plan that is shown on the display unit is selected so that the display unit and thus the user are located in this section. The current position is shown in the section of the floor plan.

It is possible that the current position of the display unit is determined using the motion signal, whereby this motion signal originates from the motion sensor of the mobile sensor arrangement. This form of implementation can be used in particular if the display unit is not able to execute any or only relatively small movements relative to the motion sensor and therefore the motion signal also applies to the movements of the display unit. It is possible to use the camera trajectory in addition to or instead of the motion signal to determine the current position.

It is also possible to use a separate position sensor to determine the current position of the display unit in the spatial area. This separate position sensor comprises, for example, an inertial sensor unit and/or a geoposition sensor. This form of implementation is particularly advantageous if a first person carries the mobile sensor arrangement with the camera and a second person carries the display unit and the two persons can move independently of each other through the spatial area or the first person is in and the second person is outside the spatial area.

A variation of the implementation form just described can be used in particular if a first person carries the mobile sensor arrangement and moves through the spatial area together with the mobile sensor arrangement and a second person views the display unit. The current position of the first person in the spatial area is determined and displayed on the display unit together with the section of the floor plan. To determine the current position of the first person, the motion signal and/or the camera trajectory are used.

It is possible for an alarm to be output in a form that can be perceived by a human if the distance between the display unit and a wall or staircase falls below a predefined barrier. This reduces the risk of a user suddenly crashing into a wall or staircase.

In one application, the process according to the invention is carried out in a building, and the system according to the invention is used in a building. The mobile sensor arrangement is moved through at least one floor of this building, and according to the invention a floor plan of this floor is determined. It is also possible that the mobile sensor arrangement is moved through at least two different floors of the building, and that a respective floor plan is determined for each floor.

In one further variation of this embodiment, selectively a section of the floor plan of the second floor or a section of the floor plan of the second floor is displayed on the display unit just described.

In the following, the invention is described by means of an embodiment example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 5 is a view showing detected key points in an infrared image;

DESCRIPTION OF PREFERRED EMBODIMENTS

Background

The following application of the invention is described: Several firefighters are walking through a building in which a fire has broken out or at least a fire is suspected. It is therefore to be expected that at least some areas of the building are smoky and/or smoked.

Figure 1:
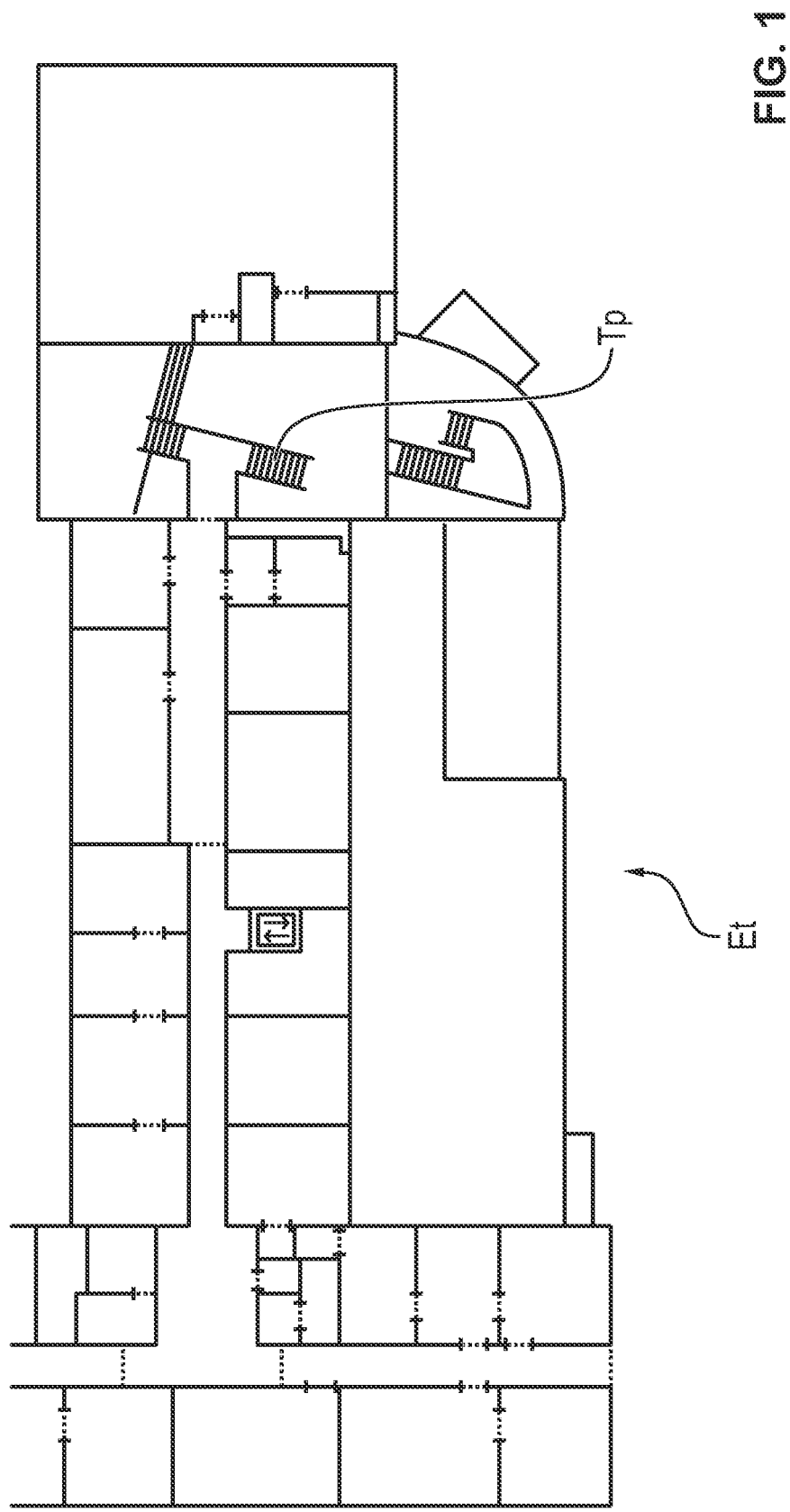
FIG. 1 is a floor plan of a floor of a building, this floor plan having been determined in advance and without using the invention.

As a rule, firefighters do not know the building. The invention provides a so-called 2.5-D map in computer-available form, which provides a floor plan of each floor and height information for each floor plan of a floor. FIG. 1 shows an example of a floor plan of a floor Et of a building, whereby this floor plan was generated in advance and without using the invention. This floor Et functions as a spatial area within the meaning of the claims. Several stairs can be seen, including the staircase Tp. In practice, such a floor plan is not usually available for use by firefighters.

In one embodiment, the 2.5D map determined according to the invention is transmitted to each firefighter in the building. It makes it easier for the firefighter to find the firefighter's way around the building or at least the floor. It is possible that this map may show the positions of other firefighters in the building. How this map is determined is described below.

Each firefighter carries the following equipment in the embodiment, and at least some of the equipment listed below is used to determine the 2.5D map:
- at least one infrared camera (thermal imaging camera) which provides images with temperature values from an infrared spectrum, preferably between 3 µm and 15 µm, and which comprises a lens and preferably at least one photosensor and a data storage and which functions as the camera,
- an inertial sensor unit that acts as the motion sensor
- optionally an infrared light source, for example a $CO_2$ laser, which emits light in the wavelength range of 10.6 µm, for example,
- optionally a distance sensor which emits radio waves, for example boring (long-distance) radar waves, and determines the distance between itself and a reflecting object from the propagation time of the radio waves,
- optionally a geoposition sensor that measures its own geoposition, and
- a communication unit that can exchange data wirelessly with the communication units of other firefighters and optionally with a spatially remote central communication unit.

At least one firefighter additionally carries a data processing signal processing unit, said signal processing unit comprising a processor and at least one data storage device.

Figure 2:
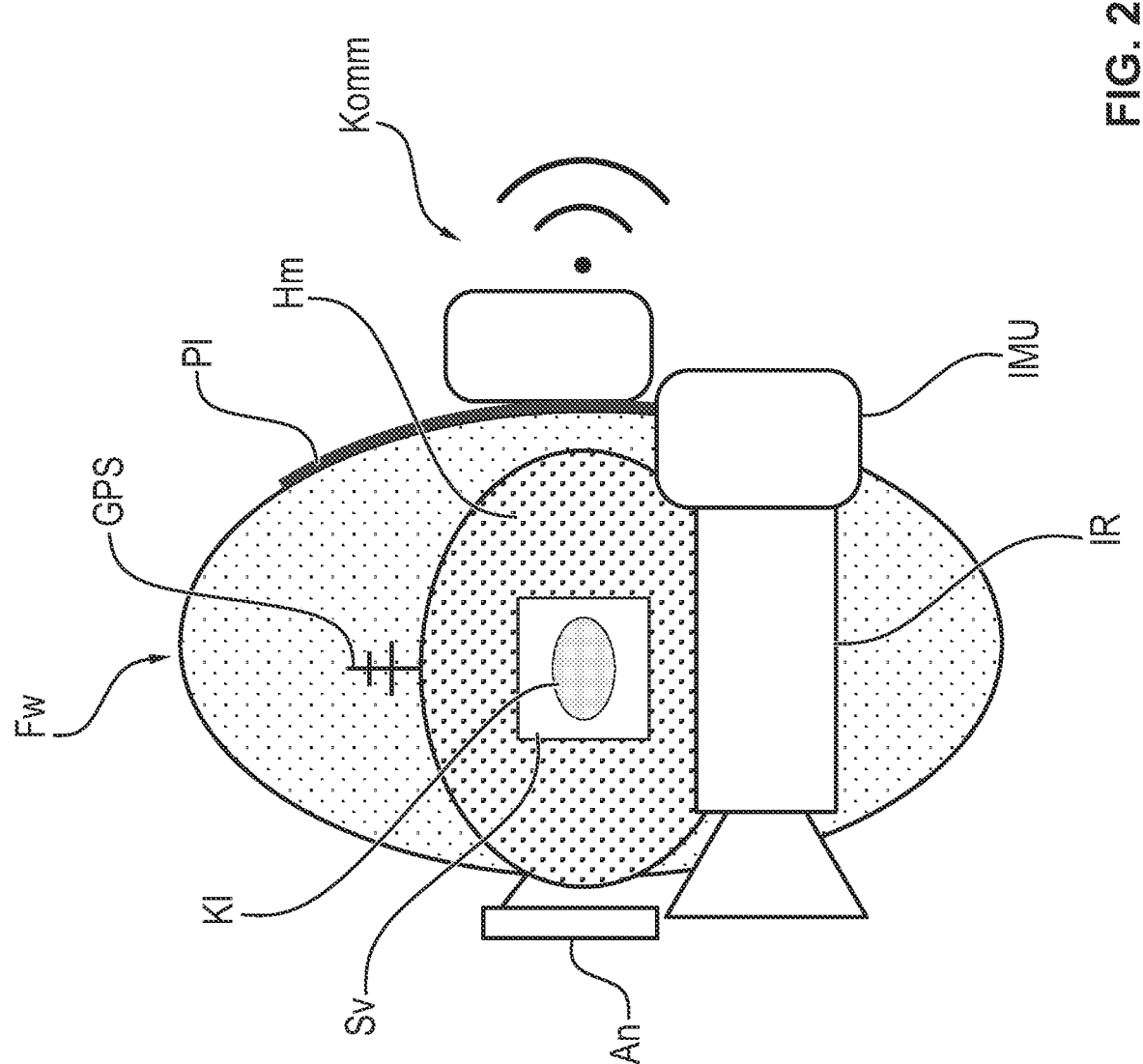
FIG. 2 is a schematic view showing the equipment of a firefighter according to the invention.

FIG. 2 shows schematically from above the protective equipment of a firefighter Fw. The protective equipment includes a helmet Hm and a carrying plate Pl. In the example shown, an infrared camera IR and a motion sensor IU are attached to the helmet Hm, both of which are described in more detail below. The camera IR and the motion sensor IMU are fixed to each other mechanically so that they cannot move relative to each other.

A display unit An is also attached to the helmet Hm. The display unit An is preferably arranged in front of the face of the firefighter Fw and can be folded away to the side or upwards. Particularly preferably, the display unit An is configured as an in-mask display on the protective helmet Hm of the firefighter Fw. The firefighter Fw can look alternately into the surroundings and at the display unit An.

In addition, the firefighter Fw carries a signal processing unit Sv, a geoposition sensor GPS and a communication unit Komm. With the help of the Komm communication unit, the firefighter Fw or also the signal processing unit Sv can exchange data with other devices. The GPS geoposition sensor measures its own geoposition.

In the embodiment example, the mobile sensor arrangement within the meaning of this disclosure includes the IR camera, the IMU motion sensor and the optional GPS geoposition sensor.

Because the building may be smoke-filled or smoky, cameras that produce images in the visible range (between 350 nm and 750 nm) often do not provide useful results. Typically, the particles in a smoke-filled or smoky room have a diameter between 1 µm and 10 µm. Therefore, infrared cameras are used, especially thermal imaging cameras. Any infrared camera used will produce images in a wavelength range above 3 µm, preferably above 7 µm. Such images are also referred to as heat tone images. Preferably, the or each infrared camera is attached to the firefighter's helmet. The IR camera of FIG. 2 is configured as such an infrared camera.

The motion sensor IU of FIG. 2 is configured as an inertial sensor unit. The inertial sensor unit preferably comprises an acceleration sensor, which measures the respective linear acceleration in the three directions of an orthogonal coordinate system, and a rotation rate sensor (gyrometer), which measures the three rotational velocities or angular accelerations. In one realization, the inertial sensor unit IU additionally comprises a magnetometer, i.e. a sensor which measures the strength of the magnetic field caused by the earth in the three directions.

Determination of a Map

In the embodiment example, a three-dimensional orthogonal coordinate system is given.

The firefighter or at least one firefighter, preferably each firefighter walks through the floor Et. Here, the infrared camera IR of this firefighter Fw continuously generates images, preferably with a fixed sampling frequency. The movement of the infrared camera IR carried by the firefighter Fw while walking through the building is detected by the inertial sensor unit IU of the firefighter Fw. Because the inertial sensor unit IMU in the embodiment example cannot perform any movement relative to the camera IR, the measured linear accelerations and angular accelerations of the inertial sensor unit IMU also apply to the camera IR.

Preferably, the signal processing unit Sv calculates at each sampling time of the inertial sensor unit IMU which position and orientation the inertial sensor unit IMU and thus the infrared camera IR currently has in the three-dimensional coordinate system. For this purpose, the signal processing unit Sv uses measured values of the inertial sensor unit IMU. The sequence of positions of the infrared camera IR is called "motion signal", the sequence of orientations is called "orientation signal".

The signal processing unit Sv determines a trajectory Tr of the camera IR in the specified three-dimensional coordinate system. This trajectory Tr describes at least approximately the actual movement path of the camera IR through the spatial area, whereby the camera IR has executed or is executing this movement path while the camera IR is moved through the spatial area as part of the mobile sensor arrangement. To determine the trajectory Tr, the signal processing unit Sv uses the motion signal and optionally the orientation signal from the motion sensor IMU as well as the images from the camera IR.

The process of determining a trajectory of a system moving in space has become known as "visual inertial odometry," but not for the application described here.

Figure 3:
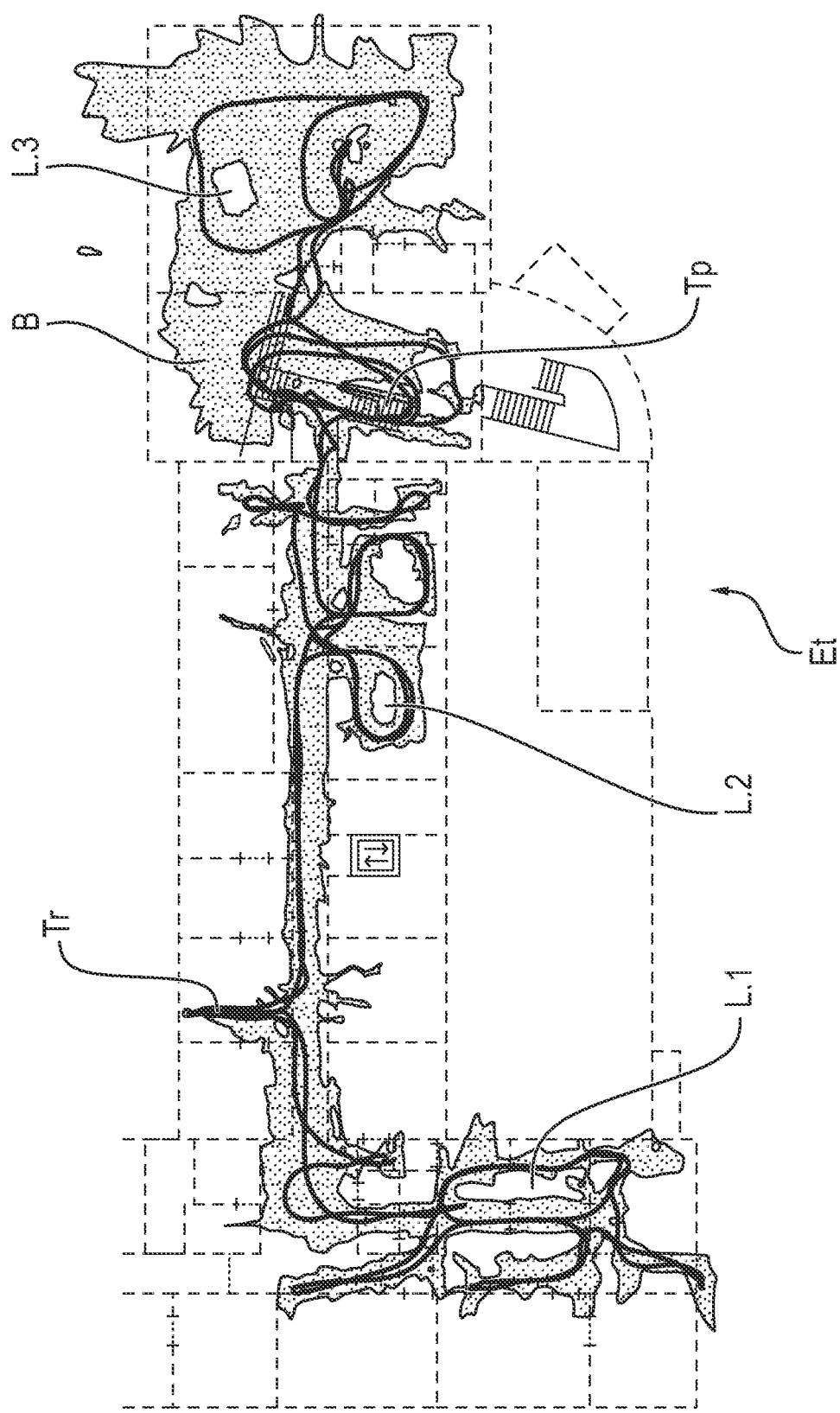
FIG. 3 is a view showing a section of a trajectory of an infrared camera carried by a firefighter on the floor of FIG. 1, the trajectory having been determined according to the invention, and the totality of the detected floor segments.

FIG. 3 shows a section of a trajectory Tr, where the trajectory Tr approximately shows the trajectory of the camera IR on the floor of FIG. 1. According to the invention, the trajectory Tr is determined while the firefighter Fw is carrying the camera IR and the camera IR is generating an image sequence. In addition, the floor plan shown in FIG. 1 is plotted in FIG. 3. Furthermore, in FIG. 3, the entirety of the detected floor segments are shown as a gray area B. Several gaps L.1, L.2, . . . can be seen in this totality B. These gaps L.1, L.2, . . . originate from pieces of furniture and other objects in the rooms.

In this trajectory Tr, the current position of the camera IR is described at each sampling time by a so-called "pose". The transition from one pose to the next pose in time is described by a translation and a rotation. In one embodiment, a so-called 6D pose is generated, i.e. one six-dimensional vector per sampling time point. Three components of this vector describe the position of a reference point of the camera IR in the three-dimensional coordinate system, the remaining three components describe the three angles between a reference axis of the camera IR and the three axes of the coordinate system. This reference axis maintains its position relative to the camera IR and is moved through space with the camera. In other embodiments, the rotational position of the camera IR is represented by a 3×3 matrix or by a 4D quaternion.

The trajectory of the camera IR is represented and stored by a so-called pose graph. At each sampling time at which the camera generates an infrared image, a node is created in this pose graph. This node represents the pose of the camera at that sampling time. Such a pose graph is described, for example, in G. Grisetti, R. Kümmerle, C. Stachniss & W. Burgard: "A Tutorial on Graph-Based SLAM," IEEE Intell. Transp. Syst. Mag. 2(4), pp. 31-43, 2010. This initial pose graph is augmented with edges between every two nodes. Each edge between two nodes represents a spatial constraint between the two represented poses. These constraints come from readings from the inertial sensor unit on the one hand, and from tracking visual features across multiple infrared images on the other. An error function is set up from the nodes and edges and minimized by an optimization procedure. This generates the final pose graph from the initial pose graph.

Figure 4:
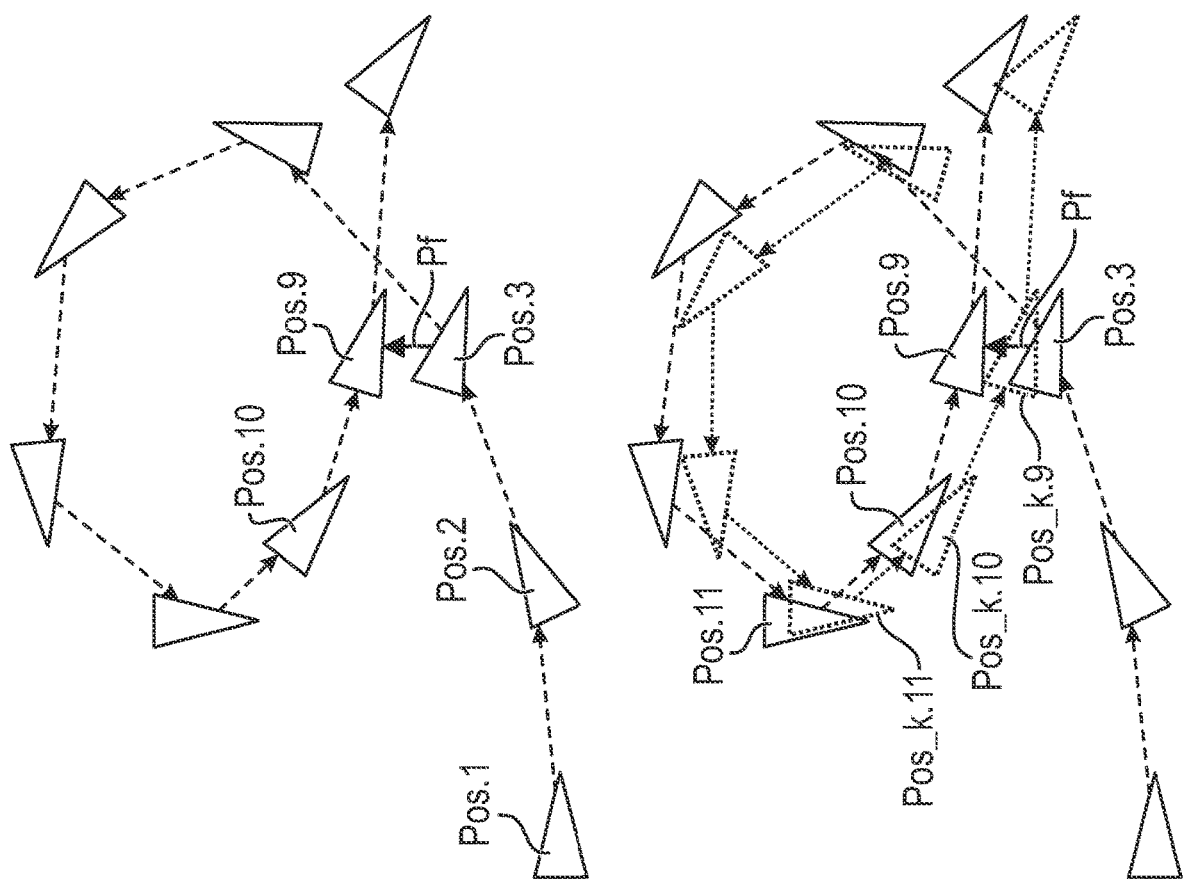
FIG. 4 is a pose graph (position/orientation graph) before and after the recognition of a scene.

FIG. 4 shows an initial pose graph at the top, in this case in a plane. Each triangle represents a pose Pos.1, Pos.2, . . . , which shows the position and orientation of the camera in the plane. The arrow Pf represents the event that at least a subarea of the floor has been recognized for the poses Pos.3 and Pos.9. This recognition is used to generate the final pose graph (bottom) with poses Pos_k.9, Pos_k.10, . . . from the initial pose graph (top).

In order to be able to recognize the same subarea in different images, characteristic visual features are searched for in the images and corresponding scenes are identified. Characteristic features are also referred to as landmarks. A characteristic feature in an image is a region of the image with characteristic properties, in particular a region showing the intersection of at least two edges of a room of the floor Et, i.e. a corner point (a vertex) in the room. Such corner points can be recognized with a relatively high degree of certainty, even if corresponding scenes show each other the same partial area from different viewing directions and/or with different imaging scales. A process based on corner points is thus robust against rotations and translations. Key points are extracted from these characteristic features, i.e. individual image points of these characteristic features. Two scenes in two different images correspond to each other if they show the same subarea, but possibly from different viewing directions and/or with different image scales. Two corresponding scenes in different images are recognized because these scenes contain the same key points.

On the one hand, characteristic features and then key points are detected in several immediately successive infrared images that originate from the same object and can ideally be clearly identified visually. Thanks to the key points, it is possible to detect the position and orientation of the infrared camera IR relative to these key points and thus relative to a room. If the same key point has been detected in at least two infrared images, triangulation is performed to determine the positions and movements of the infrared camera. This triangulation provides the pose, i.e. a six-dimensional vector (position and orientation in a three-dimensional coordinate system) of the camera IR as it is moved through the floor Et.

On the other hand, it is possible that a firefighter Fw passes through the same area of the floor Et several times. In this case, the same subarea of the floor Et appears in at least two different spaced-apart sequences of the sequence of infrared images, with several images appearing between these sequences with the same subarea that do not show this subarea because the firefighter was in another area in between. These spaced sequences thus show two corresponding scenes.

The process of automatically detecting that a previously sampled portion of a space is being resampled and recognizing this dual sampling, i.e., if a portion of the spatial area is recognized in spaced sequences, has also become known as "Visual Simultaneous Localization and Mapping" (Visual SLAM), but not yet for the application described here. Preferably, the approach described in T. Qin, P. Li & S. Shen: "Vins-mono: A robust and versatile monocular visual-inertial state estimator", IEEE Transactions on Robotics, 34(4), 2018, pp. 1004-1020, is used as a basis. To detect vertices, one implementation uses the process described in J. Shi & C. Tomasi, "Good Features to Track," IEEE 19/94, pp. 1063-1069.

In order to detect key points, especially corner points, in one embodiment points with certain features are searched for in each infrared image. To find these points, in one embodiment, the detector AGAST is applied. This detector for finding corner points is described in E. Mair, G.-D. Hager, D. Burschka, M. Suppa & G. Hirzinger: "Adaptive and generic corner detection based on the accelerated segment test", European Conf. on Computer Vision, September 2010, pp. 183-196, Springer.

Preferably, each infrared image is first computationally blurred. Preferably, a "box blur" is applied for this purpose. A box blur is a low pass filter where all elements of the kernel matrix equal 1. Blurring computationally removes all or at least some of those lines that are generated by noise, i.e. that do not show a real edge. Such lines generated by noise often "wander" with the infrared camera and can distort results. After blurring, the detector is significantly less affected by the remaining unavoidable noise.

Preferably, each infrared image is linearly normalized after blurring, namely around the minimum and maximum. A special embodiment of the normalization is described below. In the application described here, corner points are searched in infrared images, preferably in blurred and normalized infrared images.

For technical reasons, infrared images, i.e. images from thermal imaging cameras, have more static noise than images in the visible range. The noise can result in at least one line in an infrared image that is mistaken for an edge of an object. Such a noise-generated line can cause points in infrared images to be mistaken for vertices.

To reduce the influence of the unavoidable static noise, a reference image is generated. For this purpose, in an optional embodiment, a sequence of infrared images of a homogeneous surface is acquired. Each infrared image of the sequence is linearly normalized, and then the reference image is generated as an averaging over the normalized images of the sequence.

The image of a heat source in an infrared image is very different from the images of the other displayed areas. The infrared camera IR generates a sequence of infrared images as the firefighter Fw walks through the building with the infrared camera IR, often turning the firefighter's head, which changes the direction of view of the infrared camera IR. Therefore, it may happen that an infrared image shows a heat source, while the infrared image taken immediately before or after, on the other hand, does not show a heat source.

To avoid an abrupt change between the heat tone values of two successive infrared images and thus an abrupt change in contrast, the infrared images are not normalized individually. Rather, a temporal image sequence is linearly normalized. For example, the most recently acquired image is always linearly normalized. In the following, $M(n)$ denotes the modal value and $N(n)$ the normal value of the infrared image n. The modal value $M(n)$ of an infrared image is understood to be the most frequently occurring temperature value of the image n. The normal value $N(n)$ is a kind of mean or average or median of the temperature values of the image n, which is calculated iteratively.

The modal value $M(1)$ of the first image is determined. The modal value $M(1)$ is used as the normal value $N(1)$ of the first image. For each further image, a normal value $N(n)$ for the image number n ($n>=2$) is calculated step by step in a embodiment, preferably according to the calculation rule $$N(n)=N(n-1)+\varphi[M(n)-N(n-1)].$$

The function $\varphi$ is given, for example $\varphi(x)=\alpha^*x$ with a given constant. The constant $\alpha$ is smaller than 1, for example $\alpha=0.01$. This calculation rule reduces variances in the image sequence. It is also possible to apply another calculation rule to calculate the normal value $N(n)$, also a calculation rule that depends on the last m infrared images, where $m>1$.

Then, the normal value $N(n)$ of an image n is used to linearly normalize the image n as follows: A temperature range is placed around the normal value $N(n)$, and all heat tone values of image n are mapped to a fixed range of values using this temperature range. In one embodiment, a constant K is specified, and the temperature range for image n is the interval from $N(n)-K$ to $N(n)+K$. For example, the possible range of values for the heat tone values is the range from 0 to 255. A heat tone value less than or equal to $N(n)-K$ is mapped to 0, a heat tone value greater than or equal to N(n)+K is mapped to 255, and linear interpolation is performed in between. A heat tint value equal to N(n) is mapped to 127.

The effect of this calculation step with normalization is: The procedure adapts adaptively to the ambient temperature, which can change rapidly in time and/or location, especially in a building. Because a moving average is formed, abrupt fluctuations of the heat tone values in a sequence of infrared images are avoided. Such abrupt fluctuations could occur with image-by-image linear normalization. Key point detection and tracking is more robust. Because abrupt fluctuations in temperature values are avoided, key points can be better detected and tracked across the sequence of infrared images.

As just explained, a sequence of infrared images is linearly normalized. Each infrared image is mapped to a fixed temperature range around the normal value, where this normal value is around some kind of average temperature and was determined as described above.

In one embodiment, measured values from the distance sensor are also used. The distance sensor is able to measure the distance between itself and a fixed object, for example a wall. This distance, as well as a 6D pose of the camera, which with sufficient accuracy is also a 6D pose of the distance sensor, provides the direction and distance to a wall. This information can be used to improve the detection of key points.

FIG. 5 shows detected key points S.1, S.2, . . . in two infrared images. Most of the key points are image points, which are classified as corner points. However, a key point can also be another point whose surroundings show a characteristic pattern and can therefore be recognized in several infrared images. These two images were taken in the same room from approximately the same viewing angle. However, the IR camera was in a different room between the two times the two images were taken. It can be seen that some of the same key points and some different key points were detected in the two images.

The detected key points (vertices) are projected into the three-dimensional space. The trajectory is obtained using the detected and projected key points. To project the key points into the space, the preferred process is VINS Fusion, which is described in T. Qin et al (cited above).

The trajectory should describe well the actual motion path of the camera IR through the floor. However, the trajectory could have a systematic error, namely due to a vertical drift. This vertical drift results from the fact that measured values of the inertial sensor unit IMU for different sampling times are added or integrated. The motion signal of the inertial sensor unit IMU could therefore have a systematic error resulting in particular from a "build-up" of the measured values. A vertical drift is a systematic and building-up deviation that causes the determined trajectory to be shifted further and further up or down compared to the real motion trajectory of the camera IR. This computational shift is also referred to as "vertical drift".

To compensate for this systematic error to a large extent, the fact that a building usually has horizontal and vertical planes but no inclined plane is exploited. Therefore, a trajectory can be divided into sections, where one section of a trajectory is always in a horizontal plane and different sections of the trajectory are in two different planes. The event of a trajectory changing from one horizontal plane to another horizontal plane is detected when the relative slope between two poses of the trajectory relative to the overall motion along the trajectory exceeds a predefined threshold.

In other words: the relative slope between two camera poses in the z-direction relative to the overall motion exceeds the predefined threshold.

Figure 6:
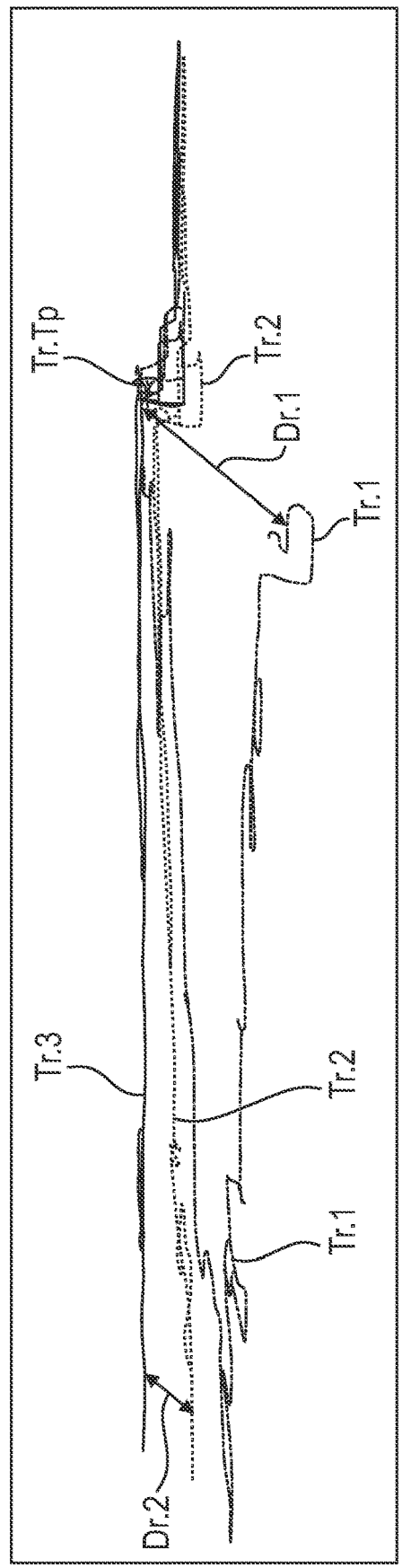
FIG. 6 is a cross-section of the trajectory of FIG. 3 in a vertical plane showing the various horizontal planes through which the firefighter has passed with the infrared camera.

FIG. 6 shows in an approximately horizontal viewing direction three different trajectories Tr.1, Tr.2, Tr.3, which are generated one after the other and show with increasing accuracy the movement path of an infrared camera through the floor of FIG. 1. The firefighter Fw with the infrared camera IR has walked from right to left through the floor of FIG. 1. In all three trajectories, there is a section Tr.Tp resulting from the firefighter climbing the stairs Tp.

In a first phase, the key points are detected in immediately successive infrared images, e.g. by VINS. This provides the initial trajectory Tr.1. A large vertical drift of the initial trajectory Tr.1 is clearly visible, which is indicated by the arrow Dr.1 in FIG. 6. In a second phase, matching key points in spaced sequences of infrared images are detected (by Visual SLAM), and this detects when the firefighter Fw has visited the same location for the second time. This leads to the intermediate trajectory Tr.2. This still has a vertical drift indicated by the arrow Dr.2. Detected is that the section Tr.Tp actually comes from a changed height, namely the staircase Tp, but the rest of the second trajectory Tr.2 extends in the same plane. The intermediate trajectory Tr.2 is shifted into this plane, providing the third and final trajectory Tr.3. This final trajectory Tr.3 is used as an estimate for the actual motion path of the camera IR.

Reflective surfaces may be present in the building, for example mirrors, cabinets or reflective walls. These reflections can simulate the presence of a person in a location where no person is actually present. For example, individual infrared images may show a mirror image of the firefighter wearing the camera IR that captured those infrared images. The reflections may also simulate key points that are actually of moving people. The group of key points marked S.1 in FIG. 5 show such a mirror image of a firefighter. In addition, a key point could be detected in an image of a person in an infrared image. This should also be avoided.

If key points were used in segments originating from a person or their mirror image, the infrared camera's motion path could be incorrectly estimated for the following reason: The camera's trajectory is estimated relative to such key points, even though the person or mirror image with those key points is moving relative to the building. To eliminate this source of error, only static key points are used in the detection of key points and such segments in infrared images that show people or mirror images of people are excluded. One reason for this is the following: these segments are moving.

Preferably, a learning process is used to detect in an infrared image any segment showing a person or a mirror image of a person. A classifier Kl is trained with a sample and is able to detect images of people or their mirror images in the camera IR images after training. This sample comprises a plurality of annotated infrared images, where each annotation in the infrared image identifies such a segment showing an object (a person or an object) in space. For example, the classifier Kl comprises a neural network trained using the sample. The annotation further indicates the type of this object. Preferably, the fact that a human is a heat source due to their body temperature is exploited. Some infrared images of this sample are preferred infrared images that do not show an object to improve the learning procedure.

Preferably, the floor segments are also detected using the same classifier Kl or another classifier, wherein this classifier performs pattern recognition and has been automatically trained using a sample. This sample comprises several annotated images.

The steps described so far generate a sequence of processed infrared images. In each processed infrared image, those floor segments and wall segments are detected which are shown in this image. Preferably, a pixel-by-pixel classification is performed. A detected segment with a too small area is excluded, because such a small segment can result from an error and is also not needed.

Figure 7:
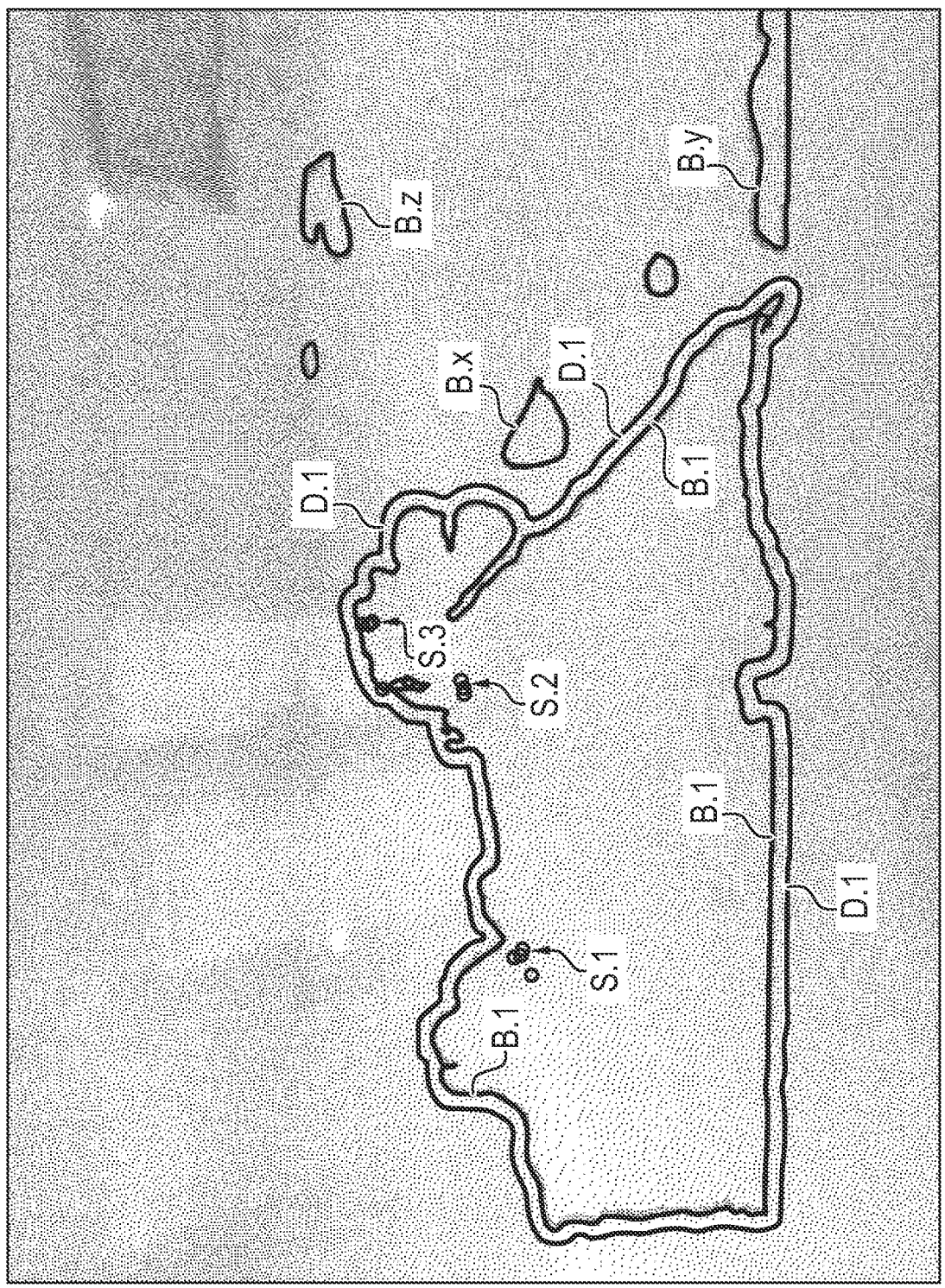
FIG. 7 is a view showing detected key points and floor segments.

FIG. 7 shows an infrared image with detected key points S.1, S.2, . . . corner points (vertices). In addition, a detected floor segment B.1 is shown. The segments B.x, B.y, B.z are not classified as floor segments, in this case because they are too small.

The detected floor segments are then projected and plotted on a grid map. A grid map is a three-dimensional grid with predetermined grid points defining predetermined cells, preferably cuboids, particularly preferably cubes. In one embodiment, the distance between two adjacent grid points that lie on a line is 10 cm. Again, the assumption is used that a building has only horizontal and vertical surfaces and therefore the floor segments are horizontal. To project the floor segments into the grid map, the trajectory and the respective camera extrinsics and camera intrinsics at each sampling time are used. The camera extrinsics is the 6D pose of the camera in space, and the camera intrinsics is the internal projection matrix of the camera lens onto the camera IR photosensor. This provides one polygon for each floor segment. The polygon is then entered into the cuboids of the grid map, where a cuboid of the grid is then marked as occupied if the polygon passes through that cuboid.

In order to be able to correctly project the trajectory and thus the floor segments into the grid map, the respective height of each floor surface in space must be determined beforehand. Each floor segment belongs to such a floor surface. For this purpose, characteristic key points (vertices) are detected in the floor segments. Preferably, the AKAZE (Accelerated KAZE (AKAZE)) detector (AKAZE feature detector) is used for this purpose, which provides a feature vector for each point in the infrared images that can be a key point. This AKAZE feature vector describes the local environment around the candidate key point.

Typically, each characteristic feature, and thus each key point, is shown in several successive infrared images. In one embodiment, the key points are localized as follows: The same key point is localized in the last N infrared images. This localization is preferably performed for several different key points. Each key point is associated with one pose of the camera IR that captured the infrared image. The key point is localized by triangulation, matching feature descriptors. In particular, the height of the key point above the ground is determined. Here, the key point is projected into a three-dimensional coordinate system by triangulation to previously generated images. If a candidate key point is detected in multiple infrared images whose pixel distance, descriptor distance, or Lowe's ratio in each of these images is above a predefined threshold, that candidate is not detected as a key point. This reduces the risk of points inside floor segments being incorrectly detected as key points.

The floor segments are adjacent to wall segments and other vertical segments. More key points are usually detected at a transition between a floor segment and a wall segment or other segment than in an inner area of a floor segment. The most important reason for this is: as a rule, a floor segment is displayed homogeneously in an infrared image, i.e., it has the same temperature value over its entire extent, because the floor segment is made of the same material over its entire area and therefore usually has an approximately equal temperature over its entire extent at one point in time. Before the key points of a floor segment are determined, the transitions between the floor segment and another segment are considered by performing a dilation of the floor segment. During a dilation, borders are made thicker, in particular, a thinner line becomes a thicker line. The reversal of a dilatation is a so-called erosion. FIG. 7 shows an example of the dilatation D.1 of the floor segment B.1.

Each projected key point has a height, i.e. a z-coordinate of its position. A floor surface consists of at least one floor segment and is usually surrounded by several key points. The height of a floor segment is calculated as the arithmetic mean or median of the z-coordinates of the key points of this floor segment. Here, a floor segment is discarded and not considered if it has too few key points or if the z-coordinates of these key points differ too much from each other. Possible reasons for this are that points in the infrared images were assigned incorrectly or do not originate from the same floor surface. This averaging of the z-coordinates provides the respective height of each floor segment.

In addition, the estimated heights of the floor segments are normalized over several infrared images. For this purpose, it is first determined in which height planes the trajectory of the camera extends. A procedure for this was described above. This procedure provides the respective height from which the infrared image was taken. All floor segments that have been taken from one and the same camera height and are contiguous in the grid ideally have the same height, but in practice have different heights. The height values of these contiguous floor segments are averaged arithmetically or by determining a median (medianically), and the arithmetic mean/median provides the estimated height that applies to all these floor segments.

Figure 8:
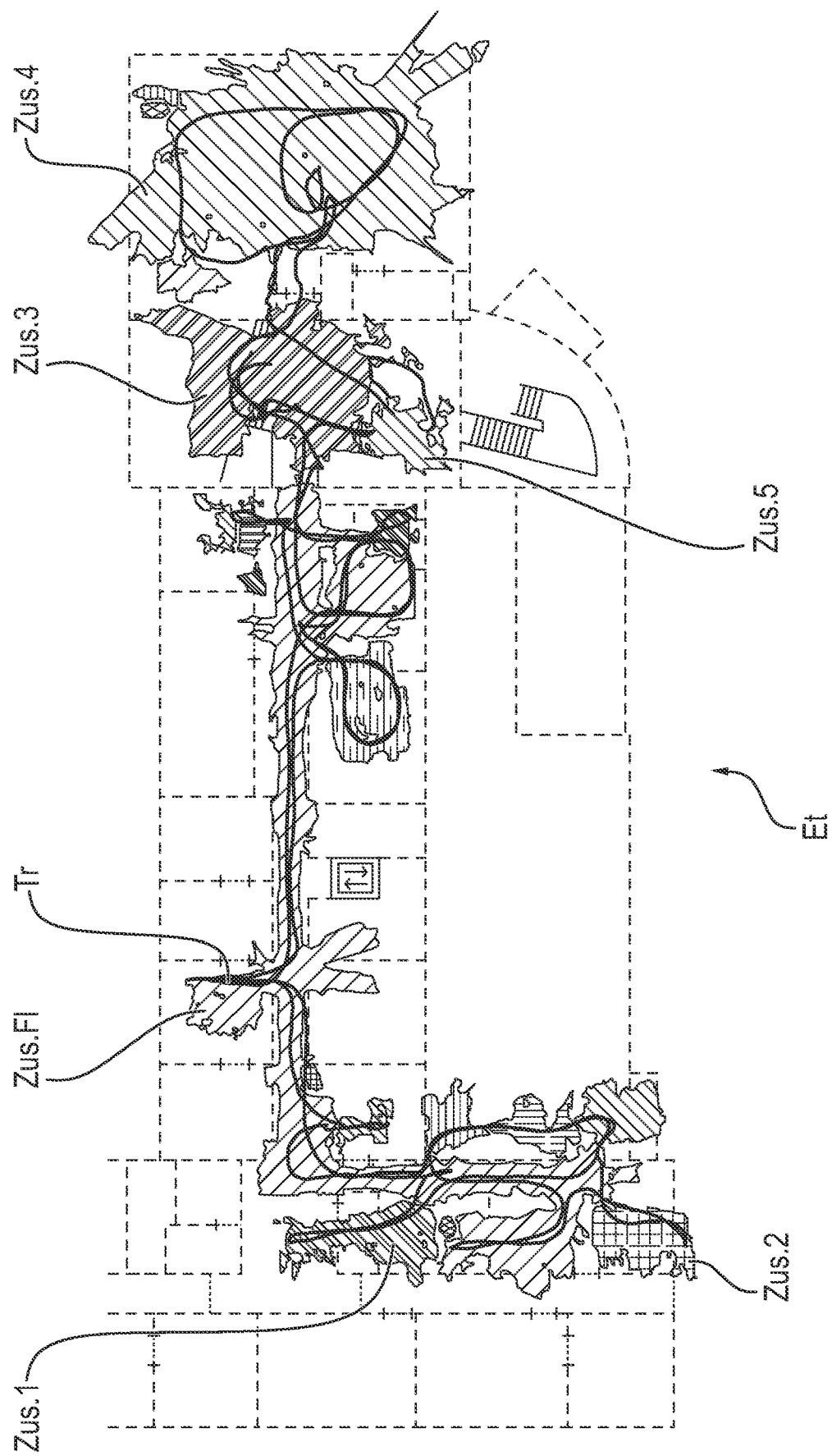
FIG. 8 is a view showing the trajectory of FIG. 3, the recognized contiguous surfaces of floor segments, and the floor plan of FIG. 1.

FIG. 8 shows the trajectory Tr of FIG. 3 and, for illustration, the floor plan of FIG. 1. Preferably, this trajectory is the final trajectory Tr.3, which was determined as described above with reference to FIG. 6. In addition, a grid is plotted where the distance between two adjacent grid points lying on a line is always 1 m. It can be seen that contiguous surfaces Zus.1, Zus.2, . . . , Zus.Fl(floor) are approximately generated from the floor segments. The gaps L.1, L.2, . . . shown in FIG. 3 have been closed. If the contiguous surfaces are generated without errors, each contiguous surface belongs to exactly one rectangular space, and in each rectangular space there is exactly one contiguous surface. In the example of FIG. 8, however, an error has occurred: two different connected areas Zus.3 and Zus.5 are wrongly assumed, although these two areas belong to one and the same rectangular space. The reason: there is a relatively narrow passage between these two areas of the space.

The procedure described so far provides a grid map in which the floor segments are entered with their respective heights. A room in a building usually has a minimum height. Using this minimum height, several height intervals are specified in such a way that at most one floor can be located in a height interval. Several floor images E(i) are generated from the grid map. For this purpose, for each given height interval, those cells are searched in the grid whose respective height value lies in this height interval. For a height interval either no such cell at all is found or a multiplicity of such cells. Each height interval with a multiplicity of cells, whose height values lie in the height interval, provides a floor image E(i). Each floor image presents a floor plan of this floor of the building.

To remove small projection errors, a corrected floor image E(i) is generated from each floor image E(i) by an erosion (morphological operation). By a first erosion, the edges are shifted orthogonally to the centers of a geometric object. A circle becomes a smaller circle and a frame becomes a thinner frame. Further erosion removes narrow transitions, especially doors. The resulting passage-free floor image E(i) describes the individual rooms and corridors of a floor and therefore contains a definition of which objects are rooms and which are not.

The corrected floor image E(i) is segmented with the help of the floor image E(i). Each map pixel in E(i) is assigned the class from the continuity-free floor image E(i) that has the shortest distance to the area in E(i) with this pixel. This segmentation is performed using the watershed algorithm (Watershed Algorithm for Image Segmentation). This algorithm is described in F. Meyer: "Color image segmentation", Proceed. International Conference on Image Processing and its Applications, pp. 303-306, IET, 1992. If a region in E(i) has no connection to a classified object, the region is discarded.

A classified object in E(i) is either a rectangular room or some other surface, in particular a corridor. The area of this object is calculated as the area of the convex hull or the smallest rectangular hull. An object is a miscellaneous surface, i.e. not a rectangular space, if an exception condition is met. The exception condition is met if the ratio of length to width or the ratio of the area of the convex hull to the area of the object is greater than a boundary.

Figure 9:
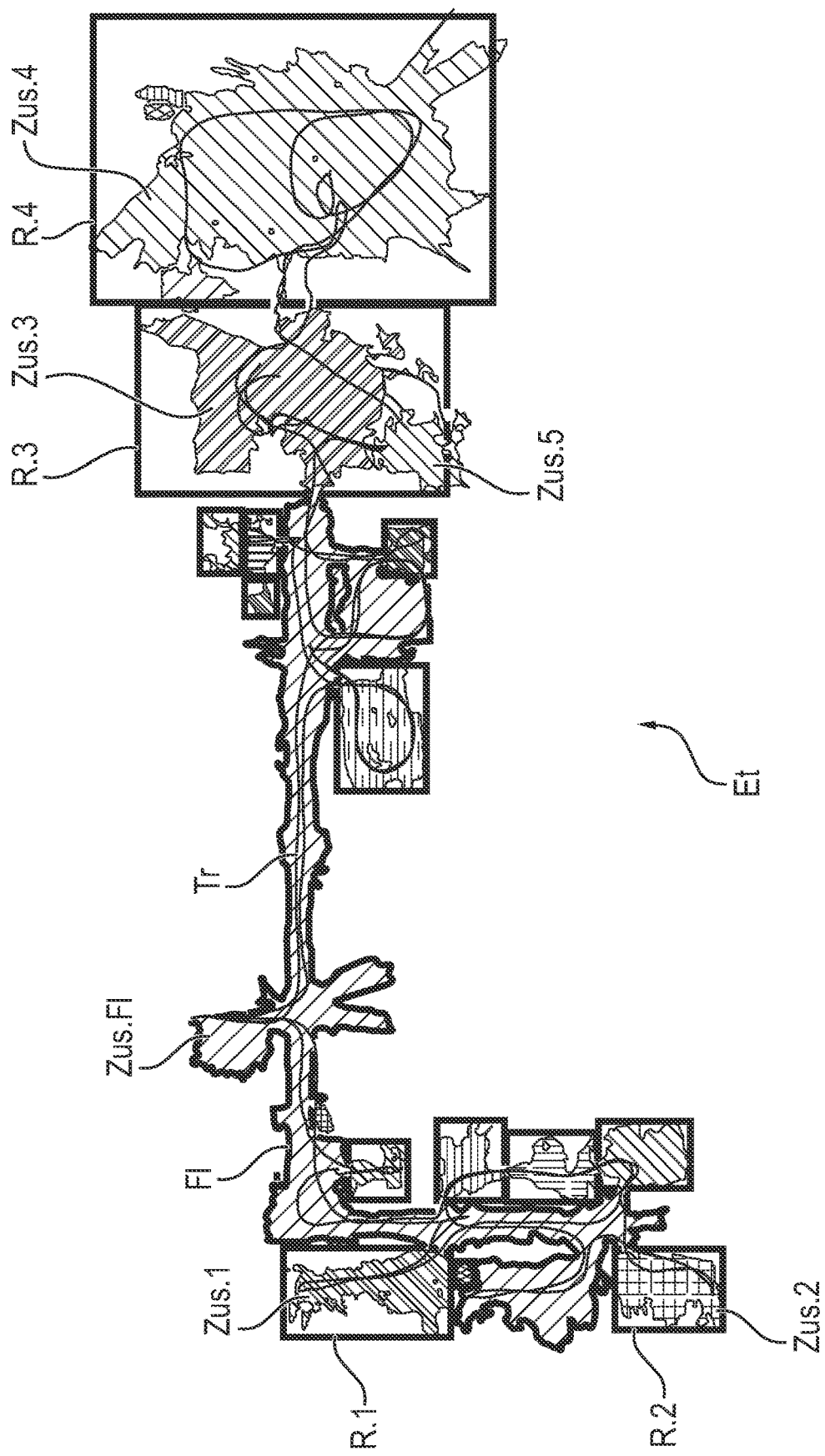
FIG. 9 is a view showing the trajectory of FIG. 3 and the recognized floor segments and the recognized rectangular spaces.
Figure 10:
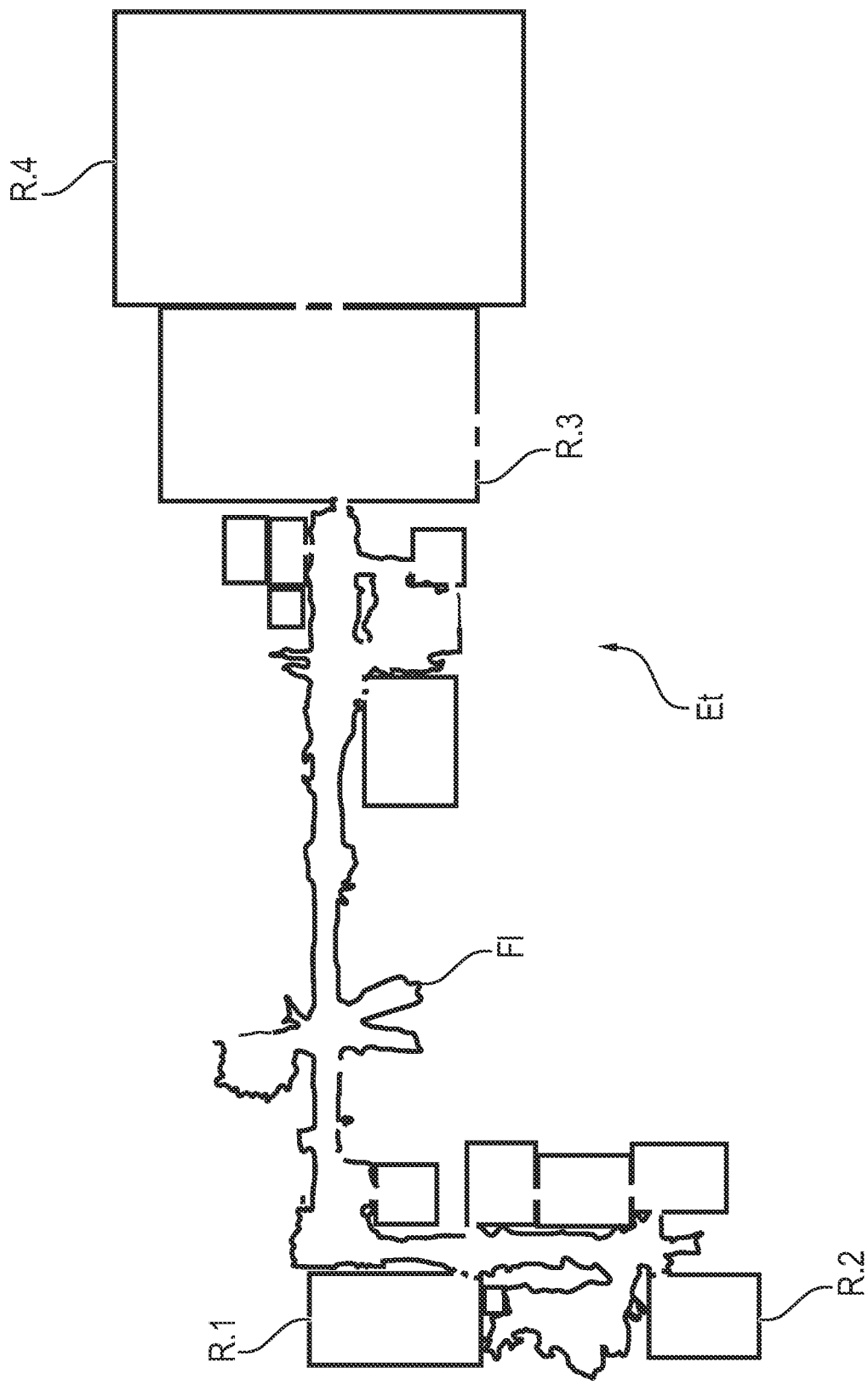
FIG. 10 is a view showing the result of FIG. 9 as a black and white presentation.

FIG. 9 shows how rectangular rooms and other areas of the floor plan, especially corridors, are detected. The presentation of FIG. 9 is obtained from the presentation of FIG. 8. Around each contiguous surface Zus.1, Zus.2, ... of floor segments a rectangle is placed in each case, if the above mentioned exception condition is not fulfilled. The exception condition is fulfilled for the connected area Zus.Fl, which is actually located in a corridor and not in a rectangular space. In the example of FIG. 9, the floor plan of FIG. 1 is not shown. Also not shown are the trajectory Tr of FIG. 3 and the recognized floor segments. Also shown are those rooms that were recognized under the assumption that rooms have a rectangular floor plan. FIG. 10 shows the result of FIG. 9 as a black and white presentation (without cross hatching).

Note: The literature describes mapping processes that use optical sensors for distance measurement, such as laser scanners or depth imaging cameras. These sensors use light in the visible range or near infrared spectra. These approaches often do not produce reliable results when used in a smoky, foggy, or extremely dusty building because light in the visible range is scattered by smoke and dust. An infrared camera avoids this disadvantage, but is unable to provide range values on its own.

In particular, the combination of Visual SLAM and semantic segmentation according to the invention is novel in order to determine a map (floor plan with height information) of a spatial area, in this case a floor of a building, with the aid of infrared images and a signal from an inertial sensor unit.

Improvement: Reference Card

The optional improvement described below requires that at least one reference map of the building is available in a form that can be evaluated by a computer. This reference map shows the floor plan of at least one floor of the building, for example as shown in FIG. 1, or the outer edge of the building. Especially for public buildings it is often mandatory to keep such reference maps available. Exterior contours of buildings are provided, for example, by map services on the Internet.

As explained above, a trajectory Tr is determined for the camera IR carried by the firefighter Fw as the firefighter walks through the floor Et and while the camera is capturing infrared images. This trajectory Tr is internally represented by the final pose graph. This final pose graph is generated by deriving an error function from an initial pose graph and minimizing it.

In the following, an improvement is described for the case that a reference map is given. First, a positioning of the camera trajectory relative to this reference map is roughly determined. In each infrared image the wall segments are detected. The given reference map also provides walls. Usually, an error occurs between the position of a wall segment detected in an infrared image and the position of the corresponding wall in the reference map. For each such error, at least one edge is added to the pose graph. Each edge represents a constraint resulting from the error. An example of such an edge is represented by the arrow Pf in FIG. 4. An error function is minimized by an optimization procedure. This error function also depends on these constraints resulting from the errors. A constraint for this error function results from the fact that in many cases in reality key points are positioned on a straight wall, but in at least one infrared image they are spaced from the wall. For the optimization procedure, for example, the "Ceres Solver" by S. Agarwal & K. Mierle can be used, which is available on the Internet at http://ceres-solver.org.

Through this procedure, on the one hand, the position and orientation of the estimated trajectory of the camera in the reference map is compensated, thereby improving the position of the trajectory. On the other hand, the trajectory is improved based on the walls shown in the reference map. In particular, the following fact is exploited in the improvement: the trajectory cannot pass through a wall.

Figure 11:
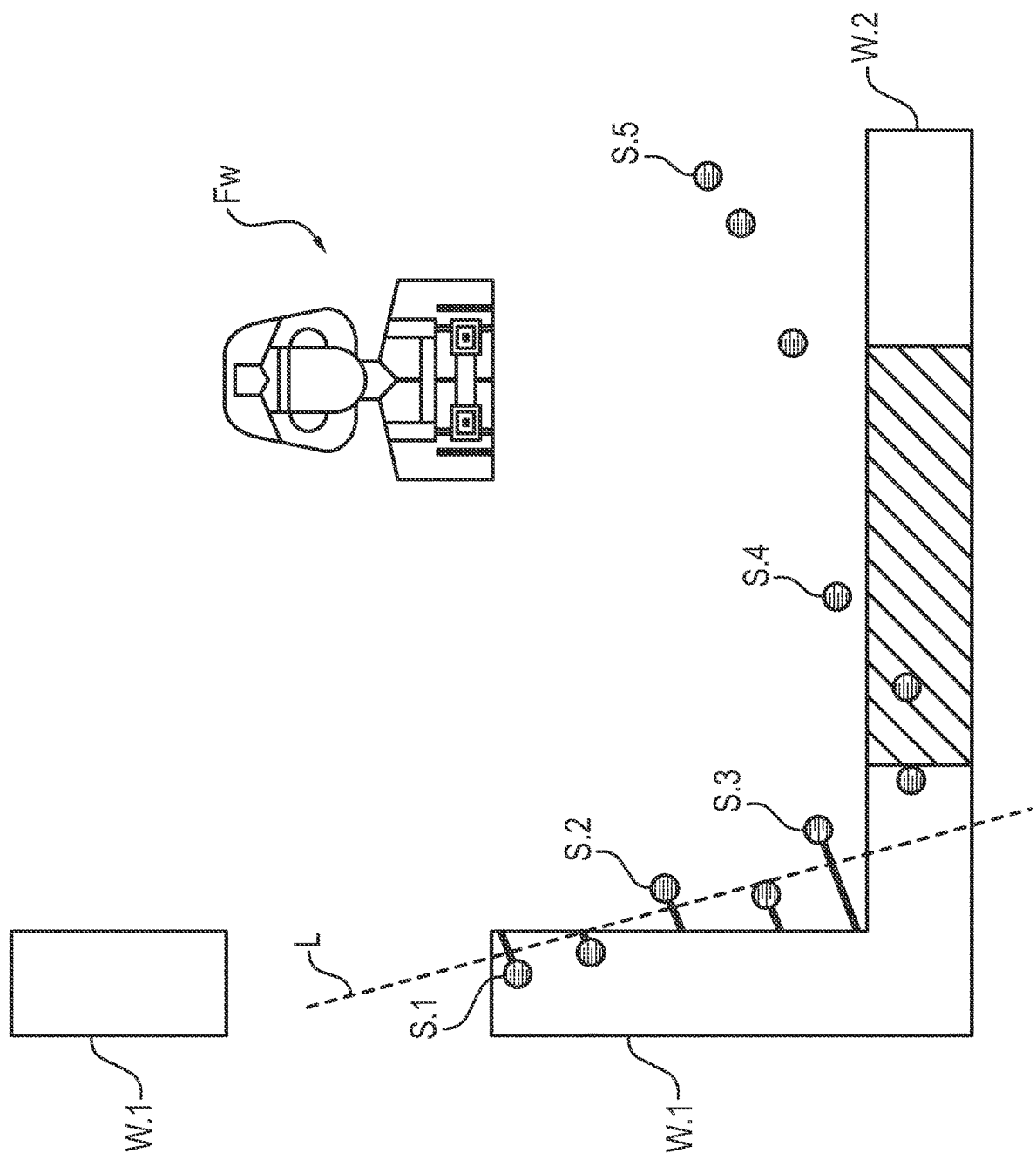
FIG. 11 is a view showing two walls of a reference map as well as estimated positions of a trajectory of a camera at different sampling times.

FIG. 11 shows two walls W.1, W.2 of a reference map as well as key points S.1, S.2, ..., which are projected onto this reference map and which are each located on a segment of a wall W.1, W.2 or at a window in this wall. The line L represents a surface on which the key points S.1 to S.3 are located in reality. Wall W.1 of the reference map is a candidate to coincide with this surface. The key points S.1 to S.3 of this surface, which is represented by the line L, are tentatively projected onto this wall W.1. This projection yields a deviation between the surface and the wall W.1. This deviation is included in the error function just mentioned. This error function is minimized.

Improvement: Map Generation from Multiple Sources

So far, a procedure has been described in which a trajectory Tr of the camera IR is determined on the basis of the measured values from the sensors that a firefighter Fw carries with them, and then a floor plan is determined. Usually, however, several firefighters, each carrying an infrared camera and an inertial sensor unit, walk simultaneously through the same floor of the building. With the help of the firefighter's communication units, a communication network (mesh network) is temporarily established. FIG. 2 schematically shows a communication unit Komm of the firefighter Fw.

In a three-dimensional coordinate system, the respective estimated position of each firefighter is entered at several successive sampling times. It is possible that several position estimates are available for the same firefighter and the same sampling time, for example based on measured values from the inertial sensor unit and signals from the communication units. To generate a position estimate based on signals from the communication units, the preferred process is Recursive Decentralized Collaborative Localization. This process is described in L. Luft, T. Schubert, S. I. Roumeliotis & W. Burgard: "Recursive Decentralized Collaborative Localization for Sparsely Communicating Robots," Robotics: Science and Systems, June 2016. The different position estimates for a sampling time point are fused into an estimated position. An extended Kalman filter is preferably used for this fusion. This step provides one position estimate for each infrared camera and for each sampling time point. In addition, the respective orientation of the infrared camera in space is available at each sampling time, namely as part of the pose.

Each firefighter's signal processing unit detects the key points in the infrared images captured by that firefighter's camera. As described above, the infrared images from the cameras are evaluated. The key points (landmarks, in particular corner points (vertices) in the present application) that the firefighters' signal processing units have detected in the infrared images are projected into the same three-dimensional space. Often the situation occurs that the same key point is shown in infrared images from at least two different cameras.

According to the optional improvement, the positions of the key points as well as the poses of the cameras that generated the corresponding infrared images are combined and evaluated together, for example, via the VINS Fusion process described in T. Qin et al. op. cit (cited above). For this purpose, an error function is minimized, and this error function takes into account all infrared images from all cameras. This step provides the respective position of each key point detected in infrared images from at least one camera in the three-dimensional space described above. Furthermore, for each camera and for each sampling time, this step provides an improved pose of the camera at that sampling time, respectively.

Preferably, a selected firefighter's signal processing unit performs this joint evaluation. Each signal processing unit of another firefighter transmits information about the detected key points to this selected signal processing unit. This embodiment eliminates the need to provide an additional signal processing unit or to use a computer outside the building. The selected signal processing unit transmits the or each trajectory calculated in accordance with the invention to all other firefighters' signal processing units.

Figure 12:
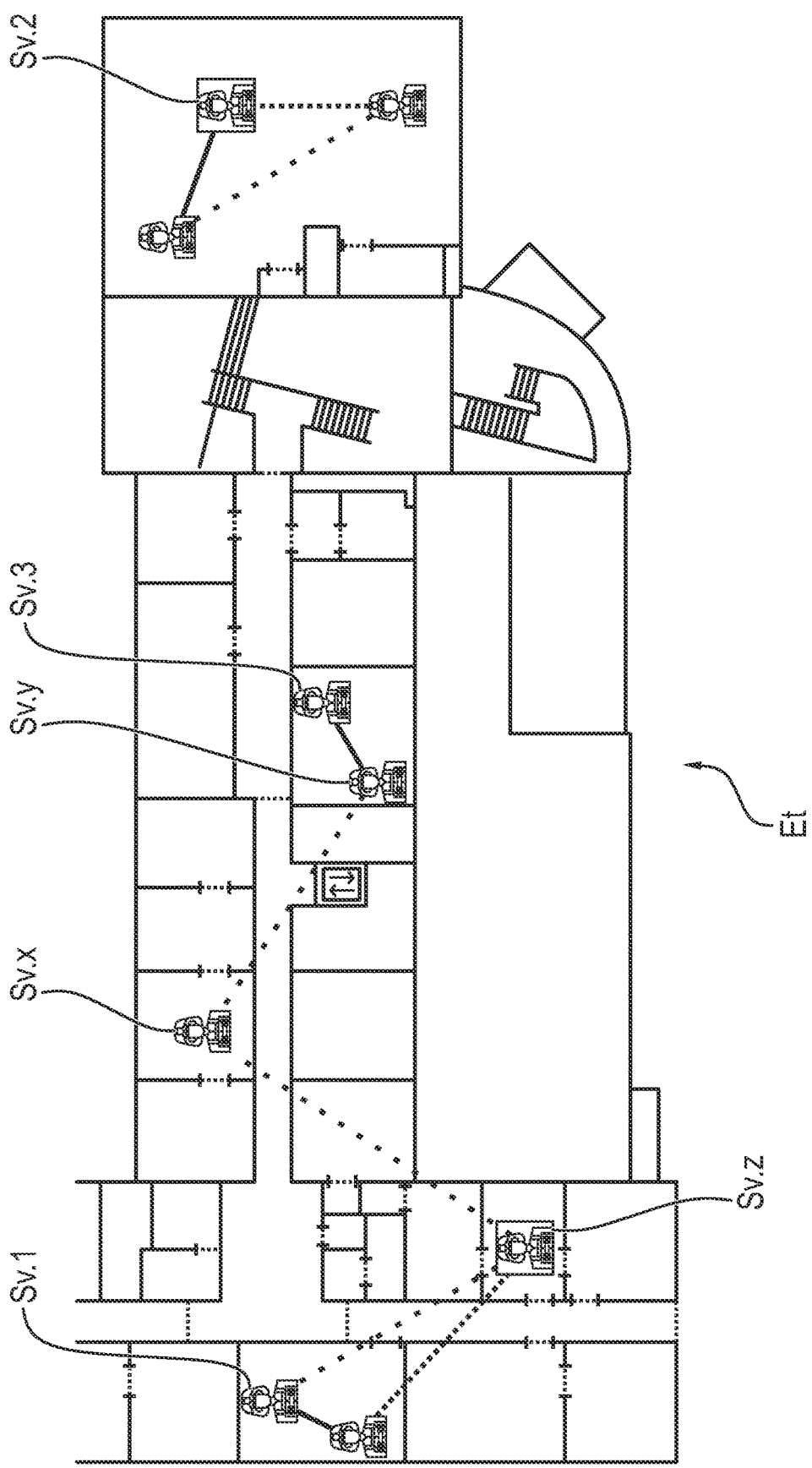
FIG. 12 is a view showing a communication network with two selected signal processing units, which perform central calculations.

In the example of FIG. 12, three selected parallel signal processing units Sv.1, Sv.2, Sv.3 perform the calculation just described. These two selected signal processing units Sv.1, Sv.2, Sv.3 have the best data connection to the other nodes in the communication network and therefore also to the signal processing units Sv.x, Sv.y, . . . . By means of solid lines a communication link with high signal strength is shown in FIG. 12, by means of dashed lines a communication link with low signal strength is shown. A communication link with high signal strength is used for improved localization. In the example, these three signal processing units Sv.1, Sv.2, Sv.3 successively calculate the trajectories Tr.1, Tr.2, Tr.3 and then the floor plan.

Improvement: Generation of Annotated Infrared Images

The process just described includes the step of automatically classifying various segments of an infrared image, for example, as an image of a floor segment, a wall or door, or a person or object in a room.

To automatically classify the image segments of the infrared images, a learning process is used, for example a neural network. Such a process needs a large number of annotated infrared images as training data set, i.e. infrared images that have already been decomposed into segments, where some of the segments each show an object (an object or a person) and wherein the information, of which type this object is, is stored as an annotation of the image segment. It would be possible, but very costly, if a user had to manually label and annotate the segments in each infrared image. Such a manual annotation of an image is also called "ground-truth classification".

The learning process is preferably applied in advance in a training phase. According to the optional improvement, a set of colored training images is given in a form that can be evaluated by a computer, namely a set of images each showing the interior of a building in the visible region. Each colored training image respectively shows at least one component of the building, e.g., a wall, a ceiling, a floor, or a door, and/or at least one object in the room. The segments of the colored training images are defined and annotated, i.e. the stored segment shows which type of object. Data sets with such annotated color images are available in large numbers today. The annotated segments of a color image B are called segmentation image S.

A synthetic image is automatically generated from each color image B. The term synthetic indicates that this image is generated by image processing and without using a camera. It resembles an infrared image and will be referred to as "thermal image T". In the following, a preferred embodiment is described in order to generate a thermal image T from a color image B.

Each pixel of a color image B is characterized by three color values (RGB values) for red, green, blue, where each color value is between 0 and 255. In the first step, an intensity image V is generated from the color image. The pixels of the intensity image V are the pixels of the color image B, and each pixel of the intensity image V is identified by a single value between 0 and 255. This value of the pixel identifies the light intensity in the pixel. In the step of generating the intensity image V, the color image B is projected into the HSV domain, keeping the intensity value and discarding the height values and saturation values. HSV means Hue (height), Saturation (saturation) and Value (intensity value).

A first thermal image T1 is generated from the intensity image V. The pixels of the first thermal image T1 are the pixels of the intensity image V and therefore also the pixels of the given color image B. To generate the first thermal image T1, the interval [0, 255] is mapped to an interval [a, b] with a<b, where 0 is mapped to a and 255 is mapped to b. The random numbers are generated by a random number generator. Boundaries a and b are generated using a random number generator, where the generated random numbers are ordered according to a normal distribution and the expected value of the normal distribution is the mean room temperature of image V and the variance $\sigma^2$ is the empirical dispersion in the temperature of all visible objects in image V. Thus, each pixel of the first thermal image T1 has a thermal value from the interval [a, b].

A second thermal image T2 is generated from the segmentation image S of the given color image B. The segmentation image S is a predefined subdivision into annotated segments and includes annotations from a predefined set of possible annotations (object types, classes). Another random number generator selects one temperature value for each possible annotation. The temperature values of the possible annotations are also arranged according to a normal distribution. Each temperature value that the further random number generator selects for a possible annotation is semantically meaningful, so that each object type assumes a realistic temperature value. Because a floor, a wall and a ceiling each assume approximately the same temperature value over their entire extent, a floor, a wall and a ceiling are taken as one object and also receive the same temperature value.

When generating the second thermal image T2, strong deviations and strong fluctuations between temperature values of neighboring segments are linearly filtered. This produces smoother transitions, which is similar to an infrared image that has been generated directly by an infrared camera. The linear filtering is performed for example with a median filter of higher spread, i.e. a filter with a higher kernel size, e.g. for a VGA resolution a kernel size of about 27×27.

The two thermal images T1 and T2 are combined into a single thermal image T, for example, by aggregating the two values of two corresponding pixels in the two thermal images $$T1 \text{ and } T2 \text{ as follows:} T=\lambda*T1+(1-\lambda)*T2+R(i)-\text{mean}[R(i)]$$

with a given factor $\lambda$, where $R(1), \ldots, R(N)$ is a set of noise images and where $R(i)$ is a randomly selected image of this set. The N noise images are generated by pointing an infrared camera at at least one homogeneous surface of identical temperature and generating N infrared images.

Figure 13:
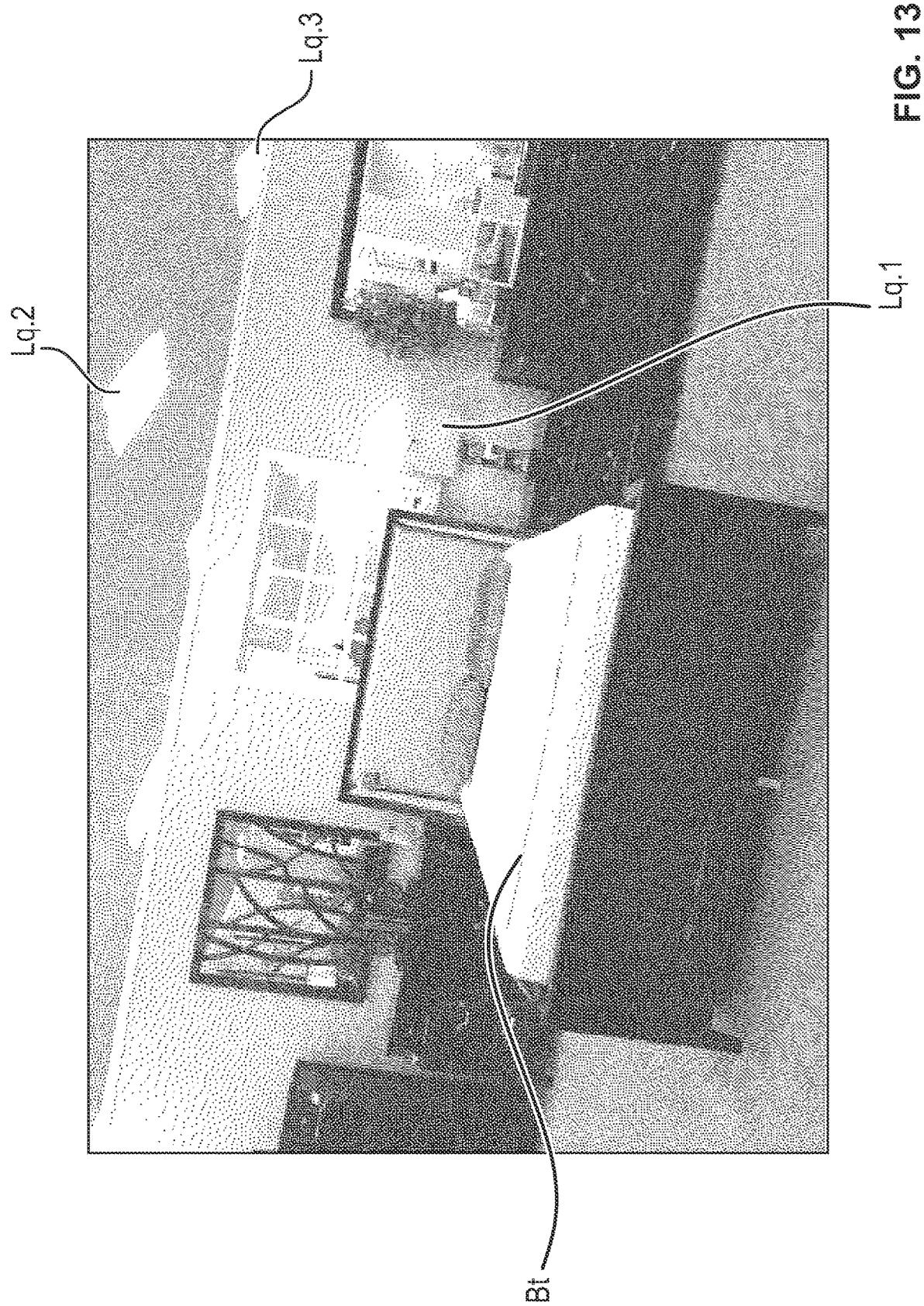
FIG. 13 is a view showing an annotated color image.
Figure 14:
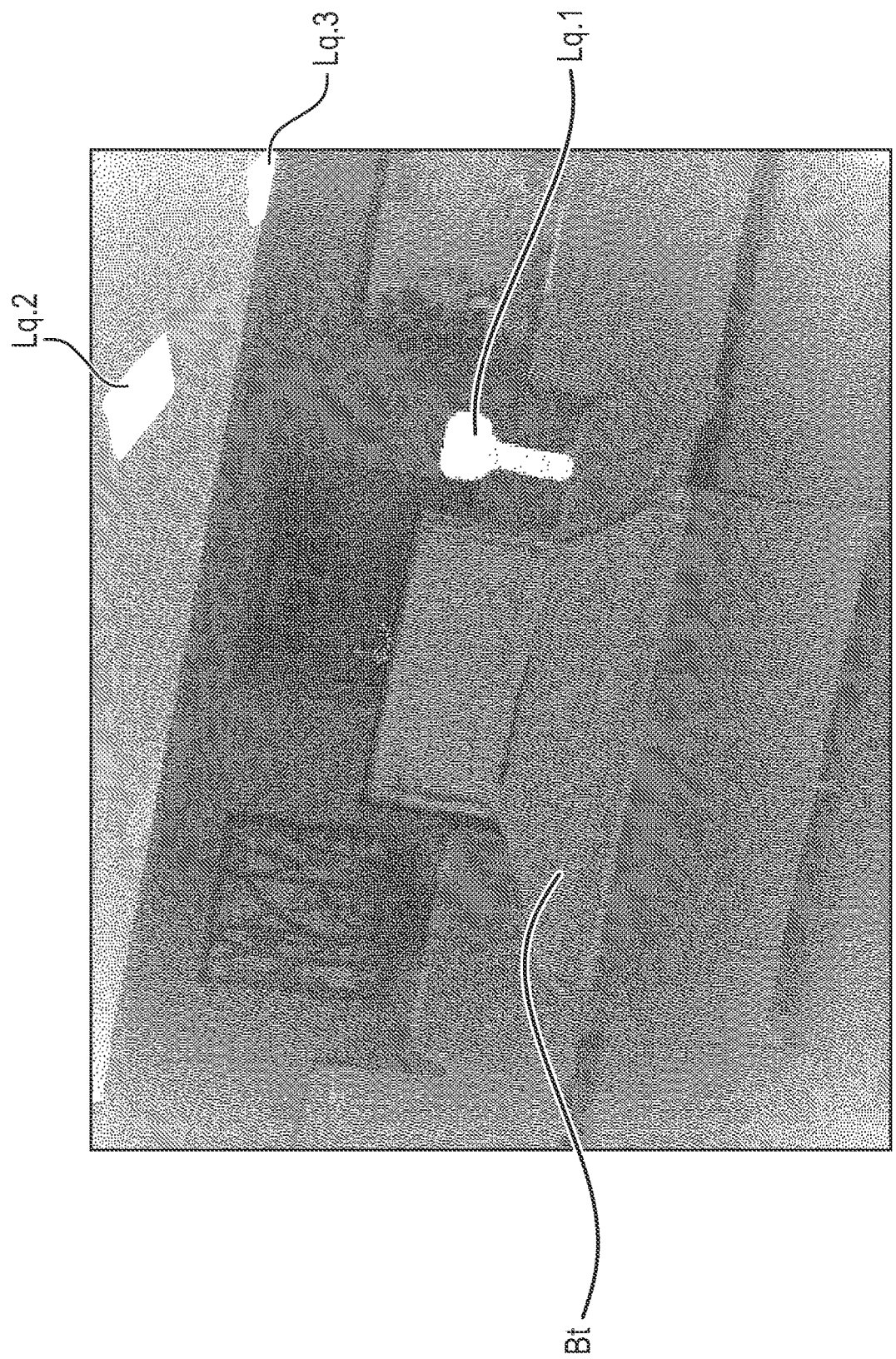
FIG. 14 is a view showing an infrared image generated from the annotated color image of FIG. 13.

FIG. 13 shows an example of a color image of an interior. Among other things, a bed Bt and several light sources Lq.1, Lq.2, Lq.3 can be seen. FIG. 14 shows the infrared image generated from this color image of FIG. 13 by the procedure just described. The light sources Lq.1, Lq.2, Lq.3 stand out clearly, the bed Bt hardly so.

Figure 15:
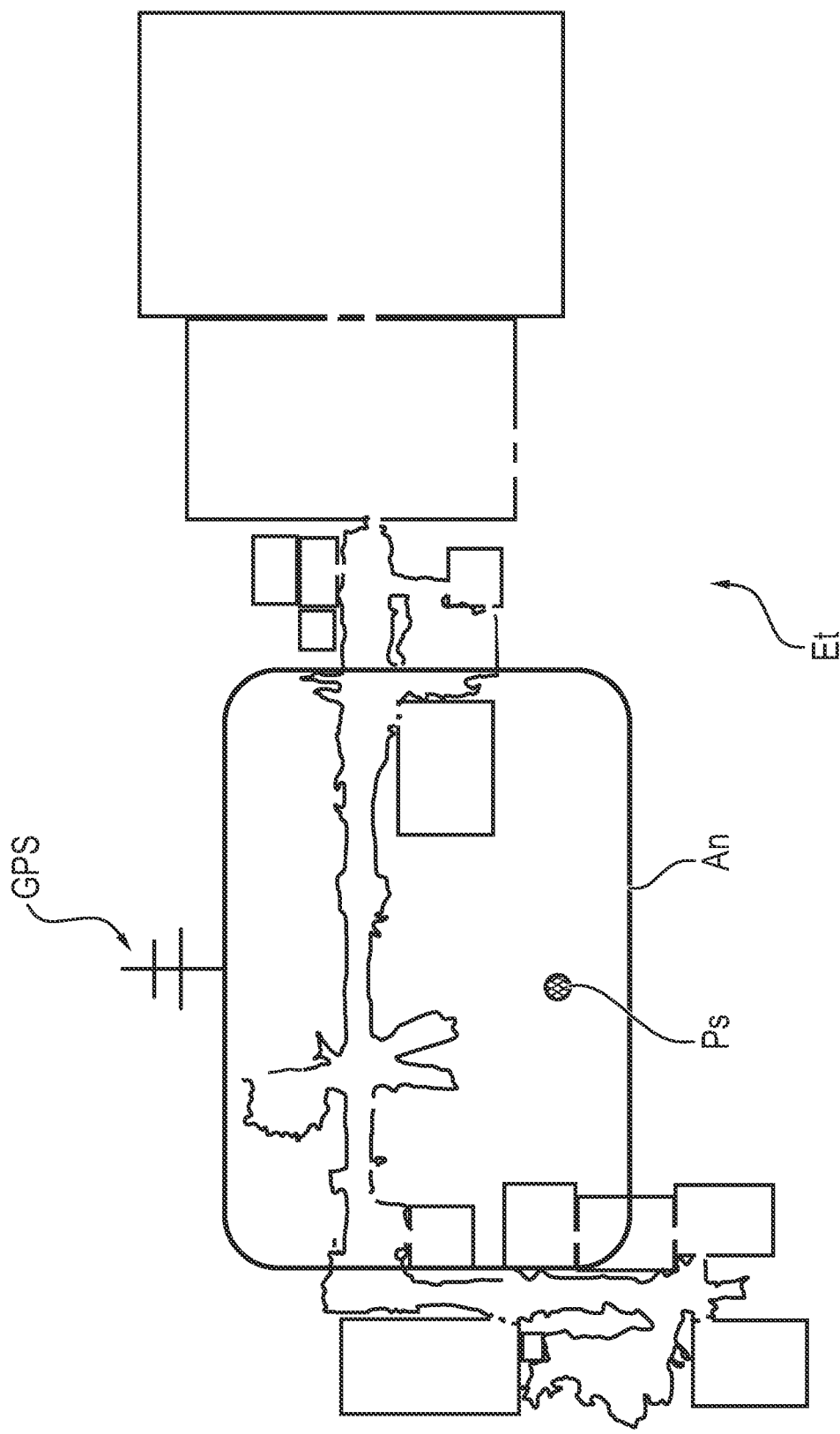
FIG. 15 is a view showing a section of the determined floor plan and the current position of a user are displayed on a screen.

FIG. 15 shows an example of a possible application of the invention. A user, for example the firefighter Fw, carries a portable device comprising a display unit An and a position sensor. In the example shown, this position sensor comprises the inertial sensor unit IMU and/or the geoposition sensor GPS. A section of the floor plan determined according to the invention is displayed on the display unit. Preferably, the screen of the display unit An is touch-sensitive, and the user can move the displayed section. Furthermore, the current position Ps of the user in the floor Et is displayed, and in the example shown by a circle in the section shown. Preferably, the cutout is displayed such that the displayed position Ps is always in the displayed cutout.

While specific embodiments of the invention have been shown and described in detail to illustrate the application of the principles of the invention, it will be understood that the invention may be embodied otherwise without departing from such principles.

LIST OF REFERENCE CHARACTERS

| | |
|---|---|
| An | Display unit attached to the helmet Hm of the firefighter Fw and on which a section of the determined floor plan is displayed |
| B | Entirety of the detected floor segments |
| B.1 | Detected floor segment |
| B.x, B.y, . . . | Contiguous segments that are so small that they are not detected as floor segments |
| Bt | Image of a bed in two pictures |
| D.1 | Dilatation of the bottom segment B.1 |
| Dr.1 | Vertical drift of the initial trajectory Tr.1 |
| Dr.2 | Vertical drift of the intermediate trajectory Tr.2 |
| Et | Floor from which a floor plan is determined |
| Fw | Firefighter carrying the protective helmet Hm and the mobile sensor arrangement comprising the infrared camera IR, the inertial sensor unit IMU and the communication unit Komm and the display unit An |
| GPS | GPS receiver |
| IMU | Inertial sensor unit of the motion sensor, attached to the protective helmet Hm of the firefighter Fw, measures three linear accelerations and three angular velocities, generates a motion signal |
| Hm | Protective helmet of the firefighter Fw, to which the infrared camera IR and the inertial sensor unit IMU, the infrared camera Ka and the receiver of the communication unit Komm are attached. |
| Kl | Classifier, in the embodiment example a component of the signal processing unit Sv |
| Komm | Communication unit, carried by the firefighter Fw, is attached to the carrying plate Pl of the compressed air breathing apparatus |
| L | Line on which the key points S.1 to S.3 are located |
| L.1, L.2 | Gaps in the whole B |
| Lq.1, Lq.2, . . . | Light sources |
| Pf | Arrow representing the correction of the initial pose graph, reason of the correction is the recognition of a partial area of the floor Et in spaced sequences of the sequence of infrared images |
| Pl | Carrying plate carrying a SCBA (compressed air breathing apparatus) and, in one embodiment, the communication unit Komm and the signal processing unit Sv |
| Ps | Displayed current position of the user on the floor Floor |
| Pos.1, Pos.2, . . . | Poses of the initial pose graph |
| Pos_k.9, Pos_k.10, . . . | Poses of the final pose graph |
| R.1, R.2, . . . | Rectangles placed around the surfaces Zus.1, Zus.2, . . . describe rectangular spaces |
| S.1, S.2, . . . | Key points detected in the IR images |
| Sv | Signal processing unit, attached to the helmet Hm |
| Sv.1, Sv.2, Sv. 3 | Selected signal processing units, successively calculate the trajectories Tr.1, Tr.2, Tr.3 and then determine the floor plan |

-continued

| | |
|---|---|
| Sv.x, Sv.y, . . . | Further signal processing units |
| Tp | Staircase shown in the floor plan |
| Tr | Trajectory showing the path of a camera through the floor plan from a vertical viewing direction. |
| Tr.1 | Initial trajectory, generated by recognition of key points in consecutive images |
| Tr.2 | Intermediate trajectory, generated by recognition of key points in spaced image sequences |
| Tr.3 | Final trajectory, generated by the projection of the intermediate trajectory Tr.2 in horizontal planes |
| Tr.Tp | Section in the trajectories Tr.1, Tr.2, Tr.3 caused by the staircase Tp. |
| W.1, W.2 | Walls of a given reference map |
| Add.1, Add.2, . . . | Detected contiguous surfaces, each belong to one room |
| Zus.Fl (Corridor) | Detected contiguous surface, belongs to a corridor |

What is claimed is:

1. A process for automatically determining a floor plan of a spatial area, wherein the process is performed using a mobile sensor arrangement attached to protective equipment for a person, the mobile sensor comprising a camera and a motion sensor, the process comprising the steps of:

moving the mobile sensor arrangement through the spatial area;

generating an image sequence with the camera when being moved through the spatial area;

generating a motion signal with the motion sensor, wherein the motion signal is a measure for the movements of the camera in a predefined three-dimensional coordinate system as the camera is moved through the spatial area;

determining those image segments in the images of the image sequence which each show at least one person;

detecting key points, which the key points are shown in at least two consecutive images of the image sequence, wherein the key points are detected in such image segments of the images which do not show a person;

determining in images of the image sequence contiguous horizontal surface segments, wherein the detected key points are used for determining the contiguous horizontal surface segments, wherein the contiguous horizontal surface segments are determined in image segments of the images which do not show a person;

determining contiguous floor segments using the determined horizontal surface segments;

determining a camera trajectory in the three-dimensional coordinate system, wherein the camera trajectory describes at least approximately an actual motion path of the camera when being moved through the spatial area, the camera trajectory being determined by using the motion signal and by using the key points; and determining the floor plan of the spatial area using the determined camera trajectory and the contiguous floor segments.

2. A process according to claim 1, wherein the step of determining the camera trajectory comprises the steps of:

determining an initial trajectory in the three-dimensional coordinate system, wherein the initial trajectory is determined by using the determined key points in consecutive images and by using the motion signal, the initial trajectory approximating the actual motion path of the camera through the spatial area;

among the determined key points, key points in non-consecutive images are detected which are shown in at least two non-consecutive images of the image sequence, wherein the at least two non-consecutive images comprise two images between which there is at least one image of the image sequence without the key point;

generating from the initial trajectory a corrected trajectory in the three-dimensional coordinate system by using the determined key points detected in non-consecutive images of the image sequence, wherein each subarea of the spatial area in which the camera has generated at least twice at least one image in each case leads to a corrected trajectory section in the corrected trajectory at least if there is an image between these at least two images which has not been generated in this subarea, and wherein the distance between two corrected trajectory sections is less than or equal to the distance between the corresponding initial trajectory sections;

computationally eliminating a possible vertical drift in the corrected trajectory using an assumption that the floor surface of the spatial area is formed of horizontal subareas, wherein for each section of the corrected trajectory having a vertical dimension, it is decided whether this section comprises a change between two horizontal subareas of the spatial area or actually extends in the same subarea; and generating a final camera trajectory by computationally eliminating the vertical drift and using the final camera trajectory as the determined camera trajectory.

3. A process according to claim 1, wherein:

the step of determining, in the images of the image sequence, those image segments which each shows at least one person, and/or the step of determining contiguous horizontal surface segments, is performed by applying pattern recognition and by using a data processing classifier;

the classifier is trained in a preceding training phase by automatically applying a learning procedure to a given sample, the sample processable by a computer; and if an image of the sample shows a person or part of a person and/or a surface segment, the segment showing the person or part of the person or the surface segment is annotated.

4. A process according to claim 3, wherein the camera configured to generate images in a wavelength range above 3 µm.

5. A process according to claim 3, wherein the sample comprises a set of images generated in a wavelength range above 3 µm.

6. A process according to claim 5, wherein the step of training the classifier comprises the steps of:

providing a computer-processable initial sample, wherein the initial sample comprises a set of images generated with light in the visible range; and generating the sample used to train the classifier by using the initial sample, wherein the generation of the sample used to train the classifier comprises the step of generating for at least some images of the initial sample each an image of the sample used for training per image of the initial sample, and wherein each color value of an image of the initial sample is mapped to a value in a wavelength range above 3 µm.

7. A process according to claim 1, wherein:

at least one image of the image sequence is linearly normalized;

the step of normalizing the image comprises the steps that a normal value is calculated as an average pixel value; and for each pixel of the image a respective pixel value is calculated that lies in an interval of specified width around the normal value.

8. A process according to claim 1, wherein:

a reference map of the spatial area is provided in a computer-processable form;

the reference map shows at least one edge between a contiguous floor segment and a wall of the spatial area; and the step of determining contiguous floor segments comprises the steps of:

determining edges between at least one wall and one horizontal surface segment using the contiguous horizontal surface segments; and correcting a respective position and/or orientation of at least one determined edge based on the reference map.

9. A process according to claim 1, wherein:

a horizontal reference plane is provided or determined, for at least one contiguous floor segment, the vertical distance of the floor segment to the horizontal reference plane is determined by using the camera trajectory, and a map of the spatial area is determined, wherein the determined map comprises the determined floor plan and for at least one floor segment an identification of the vertical distance between the floor segment and the horizontal reference plane.

10. A process according to claim 1, further comprising the steps of:

the person with the protective equipment moving through the spatial area; and as a result of the person with the protective equipment moving, the mobile sensor arrangement is moved through the spatial area.

11. A process according to claim 1, wherein:

a section of the determined floor plan is presented on a display unit; and a current position of a portable device in the spatial area is determined and presented in the displayed section;

wherein the portable device comprises the display unit or the display unit is connected to the portable device.

12. A process according to claim 11, wherein the display unit together with the mobile sensor arrangement is moved through the spatial area; and a current position of the mobile sensor arrangement is used as the current position of the portable device;

wherein preferably the current position of the mobile sensor arrangement is determined using the motion signal and/or the camera trajectory.

13. A process in accordance with claim 1, wherein the protective equipment comprises a helmet, the mobile sensor arrangement being attached to the protective equipment.

14. A system for automatically determining a floor plan of a spatial area, the system comprising:

protective equipment for a person;

a mobile sensor arrangement comprising a camera and a motion sensor, wherein the mobile sensor arrangement is configured to be moved through the spatial area, wherein the camera is configured to generate an image sequence as the camera is moved through the spatial area, wherein the motion sensor is configured to generate a motion signal that is a measure for movements of the camera in a predefined three-dimensional coordinate system as the camera is moved through the spatial area; and a data processing signal processing unit configured to:

determine those image segments in the images of the image sequence which each show at least one person;

detect key points shown in at least two consecutive images of the image sequence, wherein the key points are detected in such image segments of the images which do not show a person;

determine contiguous horizontal surface segments in images of the image sequence;

wherein the detected key points are used for determining the contiguous horizontal surface segments;

wherein the contiguous horizontal surface segments are determined in those image segments of the images which do not show a person;

determine contiguous floor segments by using the determined horizontal surface segments;

determine a camera trajectory in the three-dimensional coordinate system, the camera trajectory being determined using the motion signal and the key points, wherein the camera trajectory at least approximately describes the actual motion path of the camera when being moved through the spatial area; and determine the floor plan of the spatial area using the determined camera trajectory and the contiguous floor segments.

15. A system in accordance with claim 14, wherein determining the camera trajectory via the data processing signal processing unit comprises:

determining an initial trajectory in the three-dimensional coordinate system, wherein the initial trajectory is determined by using the determined key points in consecutive images and by using the motion signal, the initial trajectory approximating the actual motion path of the camera through the spatial area;

among the determined key points, key points in non-consecutive images are detected which are shown in at least two non-consecutive images of the image sequence, wherein the at least two non-consecutive images comprise two images between which there is at least one image of the image sequence without the key point;

generating from the initial trajectory a corrected trajectory in the three-dimensional coordinate system by using the determined key points detected in non-consecutive images of the image sequence, wherein each subarea of the spatial area in which the camera has generated at least twice at least one image in each case leads to a corrected trajectory section in the corrected trajectory at least if there is an image between these at least two images which has not been generated in this subarea, and wherein the distance between two corrected trajectory sections is less than or equal to the distance between the corresponding initial trajectory sections;

computationally eliminating a possible vertical drift in the corrected trajectory using an assumption that the floor surface of the spatial area is formed of horizontal subareas, wherein for each section of the corrected trajectory having a vertical dimension, it is decided whether this section comprises a change between two horizontal subareas of the spatial area or actually extends in the same subarea; and generating a final camera trajectory by computationally eliminating the vertical drift and using the final camera trajectory as the determined camera trajectory.

16. A system in accordance with claim 14, wherein the protective equipment comprises a helmet, the mobile sensor arrangement being attached to the protective equipment.

17. An arrangement comprising:

protective equipment for a person; and a system for automatically determining a floor plan of a spatial area, the system comprising:

a mobile sensor arrangement comprising a camera and a motion sensor, wherein the mobile sensor arrangement is configured to be moved through the spatial area, wherein the camera is configured to generate an image sequence as the camera is moved through the spatial area, wherein the motion sensor is configured to generate a motion signal that is a measure for movements of the camera in a predefined three-dimensional coordinate system as the camera is moved through the spatial area; and a data processing signal processing unit configured to:

determine those image segments in the images of the image sequence which each show at least one person;

detect key points shown in at least two consecutive images of the image sequence, wherein the key points are detected in such image segments of the images which do not show a person;

determine contiguous horizontal surface segments in images of the image sequence;

wherein the detected key points are used for determining the contiguous horizontal surface segments;

wherein the contiguous horizontal surface segments are determined in those image segments of the images which do not show a person;

determine contiguous floor segments by using the determined horizontal surface segments;

determine a camera trajectory in the three-dimensional coordinate system, the camera trajectory being determined using the motion signal and the key points, wherein the camera trajectory at least approximately describes the actual motion path of the camera when being moved through the spatial area; and determine the floor plan of the spatial area using the determined camera trajectory and the contiguous floor segments, wherein the mobile sensor arrangement is attached to the protective equipment and is configured for use while the person is moving through the spatial area.

18. An arrangement in accordance with claim 17, wherein determining the camera trajectory via the data processing signal processing unit comprises:

determining an initial trajectory in the three-dimensional coordinate system, wherein the initial trajectory is determined by using the determined key points in consecutive images and by using the motion signal, the initial trajectory approximating the actual motion path of the camera through the spatial area;

among the determined key points, key points in non-consecutive images are detected which are shown in at least two non-consecutive images of the image sequence, wherein the at least two non-consecutive images comprise two images between which there is at least one image of the image sequence without the key point;

generating from the initial trajectory a corrected trajectory in the three-dimensional coordinate system by using the determined key points detected in non-consecutive images of the image sequence, wherein each subarea of the spatial area in which the camera has generated at least twice at least one image in each case leads to a corrected trajectory section in the corrected trajectory at least if there is an image between these at least two images which has not been generated in this subarea, and wherein the distance between two corrected trajectory sections is less than or equal to the distance between the corresponding initial trajectory sections;

computationally eliminating a possible vertical drift in the corrected trajectory using an assumption that the floor surface of the spatial area is formed of horizontal subareas, wherein for each section of the corrected trajectory having a vertical dimension, it is decided whether this section comprises a change between two horizontal subareas of the spatial area or actually extends in the same subarea; and generating a final camera trajectory by computationally eliminating the vertical drift and using the final camera trajectory as the determined camera trajectory.

19. An arrangement in accordance with claim 17, wherein the protective equipment comprises a helmet.

* * * * *